(12) United States Patent
Fujita

(10) Patent No.: US 7,779,365 B2
(45) Date of Patent: Aug. 17, 2010

(54) DISPLAY CONTROL DEVICE AND PROGRAM

(75) Inventor: Yasuyuki Fujita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 204 days.

(21) Appl. No.: 10/548,094

(22) PCT Filed: Mar. 18, 2004

(86) PCT No.: PCT/JP2004/003702

§ 371 (c)(1),
(2), (4) Date: Sep. 6, 2005

(87) PCT Pub. No.: WO2004/084057

PCT Pub. Date: Sep. 30, 2004

(65) Prior Publication Data

US 2006/0150117 A1  Jul. 6, 2006

(30) Foreign Application Priority Data

Mar. 18, 2003  (JP) .............................. 2003-073416

(51) Int. Cl.
*G06F 3/048* (2006.01)
(52) U.S. Cl. ................. 715/788; 715/792; 715/790; 715/798; 715/799; 715/827
(58) Field of Classification Search .................. 715/788, 715/765, 866, 790, 801, 798, 789
See application file for complete search history.

(56) References Cited

U.S. PATENT DOCUMENTS

| 5,847,706 | A | | 12/1998 | Kingsley |
| 5,880,725 | A | | 3/1999 | Southgate |
| 6,008,809 | A | * | 12/1999 | Brooks ........................ 715/792 |
| 7,013,431 | B2 | * | 3/2006 | Taylor et al. ................. 715/788 |
| 7,036,089 | B2 | * | 4/2006 | Bauer ........................ 715/827 |
| 2002/0089546 | A1 | | 7/2002 | Kanevsky et al. |
| 2005/0108655 | A1 | * | 5/2005 | Andrea et al. ............... 715/798 |

FOREIGN PATENT DOCUMENTS

| JP | A-63-177250 | | 7/1988 |
| JP | 3250360 A | * | 11/1991 |
| JP | A 3-250360 | | 11/1991 |
| JP | A-5-324649 | | 12/1993 |

(Continued)

OTHER PUBLICATIONS

Examiner Automated Search Tool (EAST) © (Copyright 1999).*

(Continued)

*Primary Examiner*—William L Bashore
*Assistant Examiner*—Sherrod Keaton
(74) *Attorney, Agent, or Firm*—Oliff & Berridge, PLC

(57) ABSTRACT

A display control device for displaying a first display area and a second display area on a screen comprises: first control means for controlling at least one of the configuration, display content, character input direction and arrangement position of the first display area; and second control means for controlling at least one of the configuration, display content and arrangement position of the second display area based on the result of the control by the first control means.

16 Claims, 16 Drawing Sheets

FOREIGN PATENT DOCUMENTS

| | | |
|---|---|---|
| JP | A 6-274303 | 9/1994 |
| JP | 8087265 A * | 4/1996 |
| JP | A 8-87265 | 4/1996 |
| JP | A 2000-112613 | 4/2000 |
| JP | A-2001-22489 | 1/2001 |
| JP | A 2002-55750 | 2/2002 |
| WO | WO 00/63768 | 10/2000 |

OTHER PUBLICATIONS

Examiner Automated Search Tool (EAST) © (Copyright 1999) (not mailed applicants have previous copy).*

Examiner Automated Tool (EAST) Copyright 1999.*

* cited by examiner

DISPLAY CONTROL DEVICE AND PROGRAM

TECHNICAL FIELD

The present invention relates to a display control device and a program for displaying a plurality of display areas on a screen.

BACKGROUND OF THE INVENTION

Systems capable of displaying a plurality of windows (in which messages and data during work are displayed) on a display of a PC (Personal Computer), etc. as a type of user interface GUI (Graphic User Interface) environment for graphically displaying buttons and menus are well known. Such systems can improve the operability of PCs by the visual effect achieved by the display of a plurality of windows.

One of such systems has been described in Japanese Patent Provisional Publication No. 2000-112613. The system of the Publication is capable of displaying a window while partitioning it into a plurality of areas called "panes", displaying a plurality of independent windows, etc. for use of a piece of application software.

DISCLOSURE OF THE INVENTION

However, when a plurality of panes are displayed in a window, the configuration of a pane restricts configurations of other panes, by which viewability of a pane can be deteriorated. Meanwhile, when a plurality of independent windows are displayed on the screen, some of the windows may overlap with one another due to the limitation of the viewable range on the screen, by which viewability of the windows can get worse. Such deterioration of the viewability of application software lowers operability of the application software. In such cases, the user has to adjust the configurations, arrangement positions, etc. of the panes or windows on the screen by manual operation so that display status of the panes/windows will be optimum. Such work is troublesome to the user, deteriorating the operability of the application software.

It is therefore the primary object of the present invention to provide a display control device and a program improving the viewability and operability of application software having a plurality of display areas.

In accordance with an aspect of the present invention, there is provided a display control device for displaying a first display area and a second display area on a screen, comprising: first control means for controlling at least one of a configuration, display content, character input direction and arrangement position of the first display area; and second control means for controlling at least one of a configuration, display content and arrangement position of the second display area based on result of control by the first control means.

By the above configuration, at least one of the configuration, display content and arrangement position of the second display area is adjusted automatically based on the status of the first display area, by which the viewability and operability of application software can be improved.

In accordance with another aspect of the present invention, there is provided a program for displaying a first display area and a second display area on a screen, instructing a computer to function as: first control means for controlling at least one of a configuration, display content, character input direction and arrangement position of the first display area; and second control means for controlling at least one of a configuration, display content and arrangement position of the second display area based on result of control by the first control means.

By the above configuration, at least one of the configuration, display content and arrangement position of the second display area is adjusted automatically based on the status of the first display area, by which the viewability and operability of application software can be improved.

In accordance with another aspect of the present invention, there is provided a display control device for controlling display on a screen, comprising first control means for controlling status of an editing area for editing work and second control means for controlling status of an auxiliary area for displaying information for assisting the editing work in the editing area depending on a change of the status of the editing area made by the first control means.

By the above configuration, the status of the auxiliary area is adjusted automatically based on the status of the editing area, by which the viewability and operability of application software can be improved.

In accordance with another aspect of the present invention, there is provided a display control device for controlling display on a screen, comprising first control means for controlling status of a print area with respect to an editing area for editing work and second control means for executing control so as to change status of an auxiliary area for displaying information for assisting the editing work in the editing area depending on a change of status of the editing area with respect to the print area made by the first control means.

By the above configuration, the status of the auxiliary area is adjusted automatically based on the status of the print area with respect to the editing area, by which the viewability and operability of application software can be improved.

In accordance with another aspect of the present invention, there is provided a method for controlling display on a screen, comprising the steps of: detecting status of an editing area for editing work, judging whether a change of status of an auxiliary area for displaying information for assisting the editing work in the editing area is necessary or not based on the detection of the status of the editing area, and changing the status of the auxiliary area when the change is judged to be necessary.

By the above configuration, the status of the auxiliary area can be adjusted automatically based on the status of the editing area, by which the viewability and operability of application software can be improved.

BEST MODE FOR CARRYING OUT THE INVENTION

Figure 1:
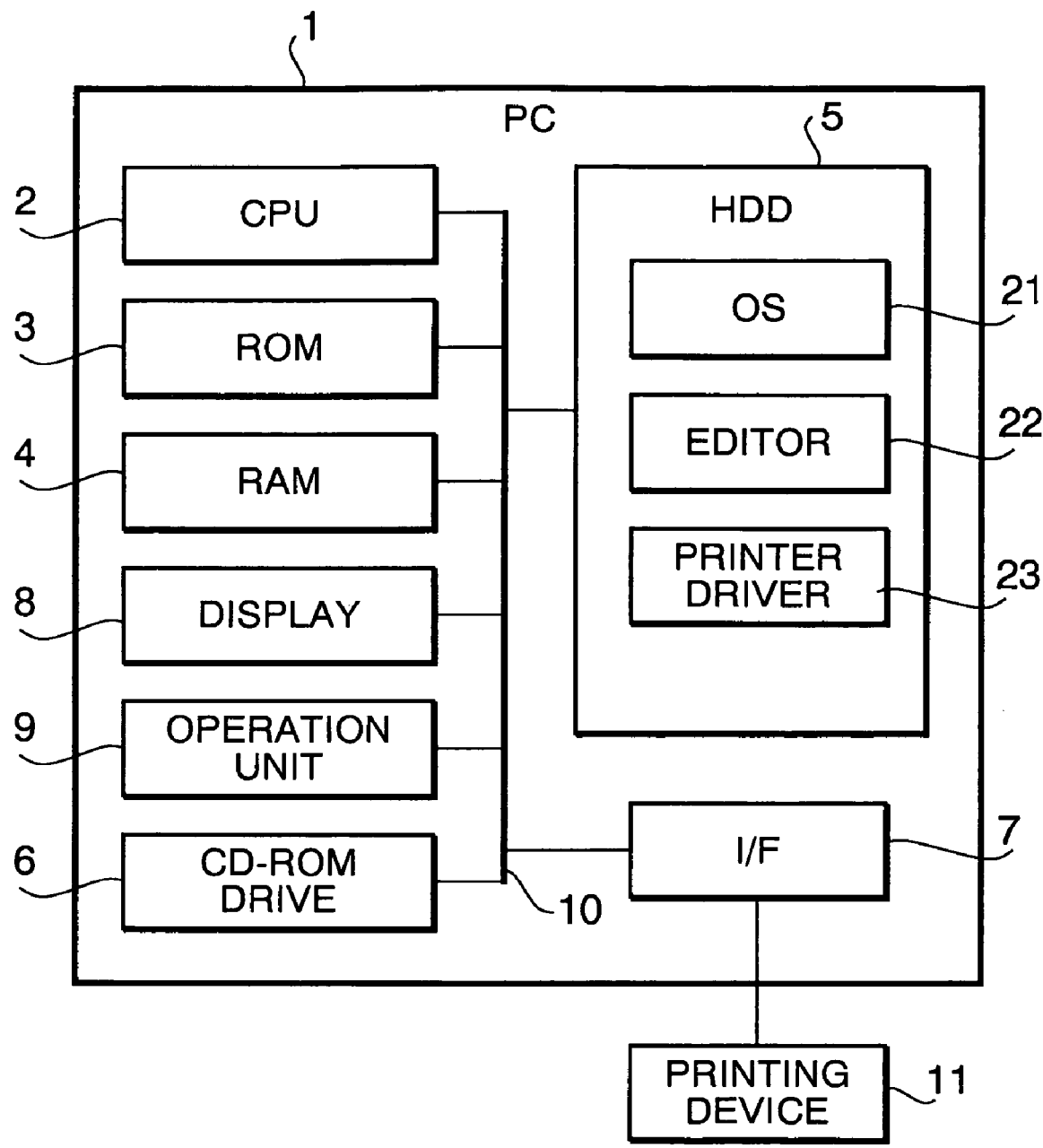
FIG. 1 is a block diagram showing the composition of a PC as a display control device in accordance with an embodiment of the present invention.

Referring now to the drawings, a description will be given in detail of preferred embodiments in accordance with the present invention.

The composition of a display control device in accordance with an embodiment of the present invention will be described below referring to FIG. 1. FIG. 1 is a block diagram showing the composition of a PC (Personal Computer) 1 which functions as the display control device. The PC 1 includes a CPU (Central Processing Unit) 2, a ROM (Read Only Memory) 3, a RAM (Random Access Memory) 4, an HDD (Hard Disk Drive) 5, a CD-ROM drive 6, an interface 7, a display 8 and an operation unit 9 which are connected together by a system bus 10. The PC 1 is connected to a printing device 11 via the interface 7.

The CPU 2 is a central processing unit for controlling the PC 1. The CPU 2 communicates instructions, data, etc. with all devices in the PC 1 via the system bus 10. The CPU 2 reads out an OS (Operating System) and application software from the HDD 5 and executes them.

The ROM 3 is a read-only storage device forming a part of a main memory space used by the CPU 2. The ROM 3 stores a program for starting up the OS of the PC 1, etc. The RAM 4 is a readable/writable volatile storage device, which also forms a part of the main memory space of the CPU 2 similarly to the ROM 3.

The HDD 5 is a readable/writable storage device and its reading device. The HDD 5 stores software like an OS 21, an editor 22, a printer driver 23, etc. The OS 21 is the aforementioned operating system for operating the PC 1. Incidentally, the PC 1 employs Microsoft Windows (registered trademark) as the operating system.

The editor 22 is application software run on the OS 21, having functions for creation and editing of content to be printed by the printing device 11 and for the printing of the content. The editor 22 also has a display status control function for controlling display status of windows displayed on the display 2. The printer driver 23 provides the application programs (editor 22, etc.) with a function of carrying out printing by use of the printing device 11.

The CD-ROM drive 6 is a device for reading out information from a CD-ROM as a record medium. The CD-ROM drive 6 is used, for example, for installing the OS 21, the editor 22, the printer driver 23, etc. (stored in a CD-ROM) in the HDD 5. The interface 7 is an interface (e.g. USB (Universal Serial Bus) interface) for connecting the PC 1 with external devices like the printing device 11. The display 8 is a display device such as a liquid crystal display. The operation unit 9 is a device (keyboard, mouse, etc.) used for operating the PC 1. The user gives instructions to the PC 1 by operating the keyboard, mouse, etc.

The printing device 11 is a device for printing on a tape-like print medium (rectangular print medium whose length in a particular direction is variable). The printing device 11 may either be an ordinary printing device using ordinary print sheets as the print media or a label printing device using ID labels for stamps as the print media.

Figure 2:
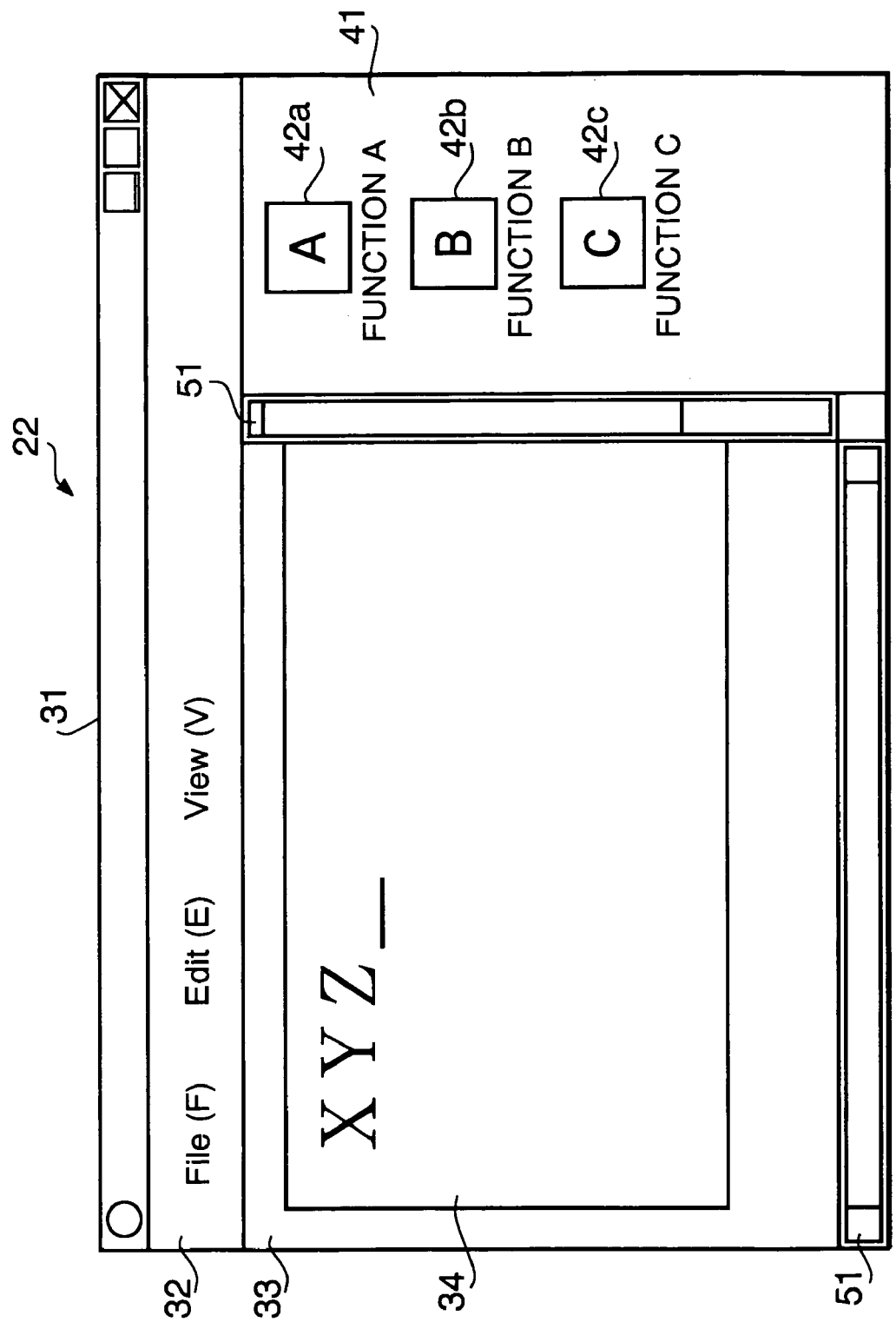
FIG. 2 shows an example of an operation screen of an editor activated on the PC of FIG. 1, in a state in which a display status control function has been turned off.

Next, an operation screen of the editor 22 which is activated on the PC 1 will be described below referring to FIG. 2. FIG. 2 shows an example of the operation screen of the editor 22 in a state in which the display status control function (explained later) has been turned off.

A window 31 shown in FIG. 2 includes a menu bar 32, an editing area 33 and an auxiliary area 41. The menu bar 32 is an area in which a menu for operating the editor 22 is displayed. By making a selection from menu items arranged in the menu bar 32, any one of the functions of the editor 22 can be carried out. For example, the user hoping to change the direction of display content in the editing area 33 clicks a button "View (V)" in the menu bar 32 with the mouse, by which a menu, to which functions of the editor 22 regarding display (View) have been assigned, is displayed. Then, the user further clicks a part of the displayed menu regarding the change of the direction of the display content in the editing area 33. Other functions of the editor 22 can also be called and carried out similarly.

The editing area 33 is an area used for creating or editing print content to be printed by the printing device 11. The editing area 33 includes a print area 34 (as the display content of the editing area 33) and scroll bars 51. The print area 34 is an area which is partitioned imitating the configuration of a print sheet as the print medium. Each editing operation in the print area 34 is directly incorporated in the printing on the print sheet, that is, the editor 22 realizes the so-called WYSIWYG (What You See Is What You Get). The scroll bars 51 are bars to be used for scrolling the content being displayed in the editing area 33.

The auxiliary area 41 is an area for assisting the creation/editing of the print content in the editing area 33. In the auxiliary area 41, function icons 42a-42c are arranged. The function icons 42a-42c are icons representing functions frequently used in the editing area 33, such as a character decoration function, an image input function and an image deformation function, for example. By clicking a function icon 42a-42c with the mouse or dragging the function icon to the editing area 33, a function which has been assigned to the function icon is executed. Incidentally, the contents of the function icons 42a-42c and the number of icons can be changed freely by settings made by the user.

The auxiliary area 41 is capable of displaying not only the function icons 42a-42c but also various data for assisting the creation/editing of the print content in the editing area 33. For example, model sentences (samples) to be inputted to the editing area 33 can be displayed in the editing area 33 (see FIG. 6). The auxiliary area 41 is displayed according to two display methods: pane display (displaying the auxiliary area 41 as a pane built in the window 31) and floating display (displaying the auxiliary area 41 as a window independent of the window 31).

In the editor 22, the display statuses of the editing area 33, the print area 34 and the auxiliary area 41 can be adjusted freely by operations performed by the user. In the example of FIG. 2, the editing area 33 and the auxiliary area 41 are built in the window 31 to partition the window 31 horizontally (with the editing area 33, print area 34 and auxiliary area 41 being relatively long in the vertical direction). In such arrangement, the auxiliary area 41 restricts the width of the editing area 33 in the horizontal direction (narrowing the viewable range of the editing area 33 in the horizontal direction), by which viewability and operability of the print area 34 being wide in the horizontal direction are deteriorated. In this editor 22, the configuration, display content and arrangement position of the auxiliary area 41 are adjusted and optimized so as to avoid the deterioration of the viewability and operability of the editing area 32 when the user has made a setting for enabling the display status control function.

The CPU 2 executes commands according to the program of the editor 22 stored in the HDD 5, by which the PC 1 functions as the editor 22. The CPU 2 (operating according to the program of the editor 22) functions as a first control means for controlling the configuration, display content, character input direction and arrangement position of the editing area 33 according to mouse/keyboard operations performed by the user. The CPU 2 also functions as a second control means for controlling the configuration, display content and arrangement position of the auxiliary area 41 based on the result of control by the first control means. In short, the PC 1 implements the display status control function by the function of the second control means.

Next, the details of the display status control function will be explained below. The display status control function is a function for changing at least one of the configuration, display content and arrangement position of the auxiliary area 41 based on the status of the editing area 33 which has been changed by instructions from the user. The display status control function includes: (1) automatic adjustment of pane configuration, (2) automatic adjustment of sample display, (3) automatic switching between floating display and pane display, and (4) automatic adjustment of floating position. The above functions will be explained below one by one.

Figure 3:
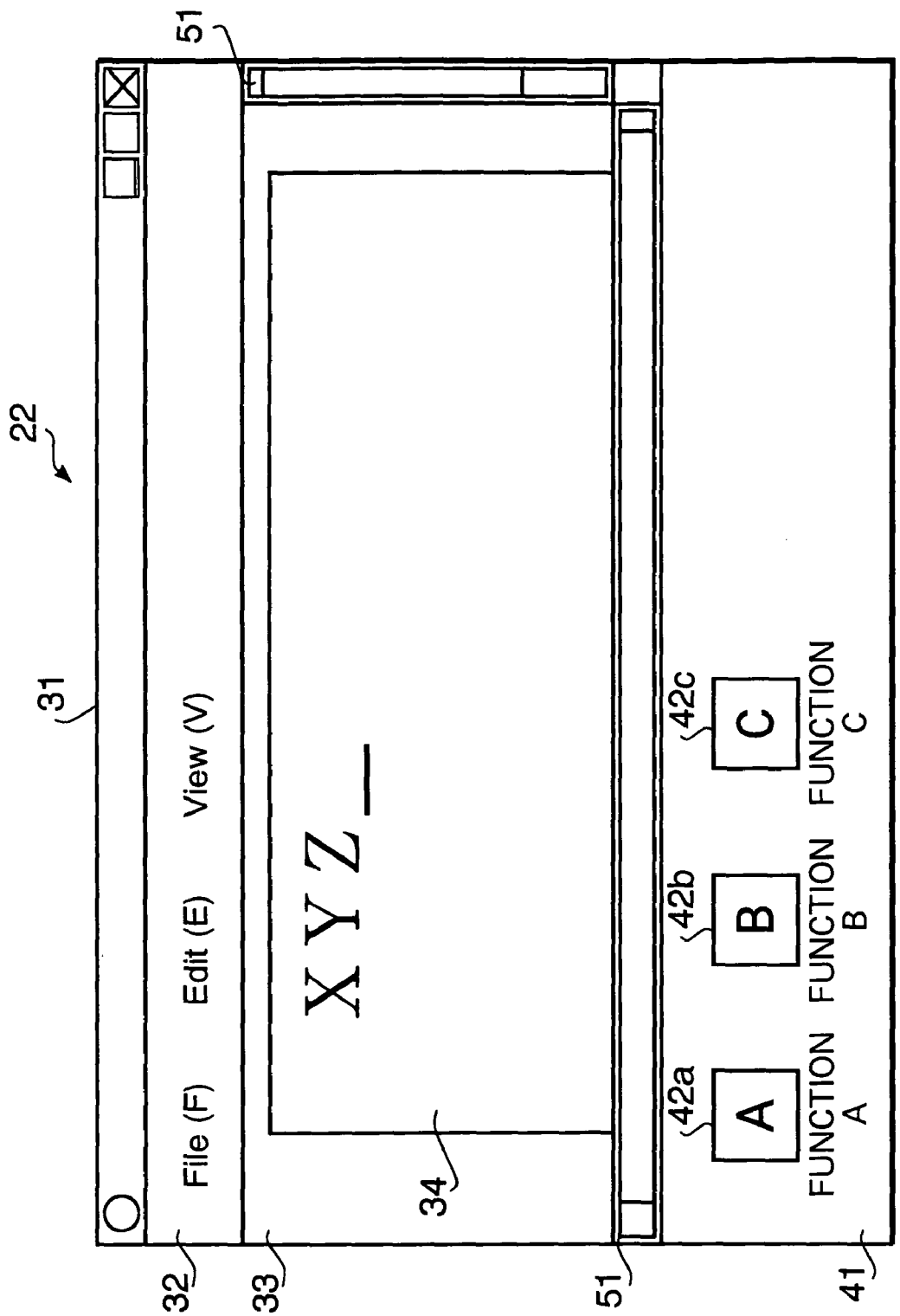
FIG. 3 shows an example of the operation screen of the editor activated on the PC of FIG. 1 when a change has been made to let a print area be wide in the horizontal direction.
Figure 4:
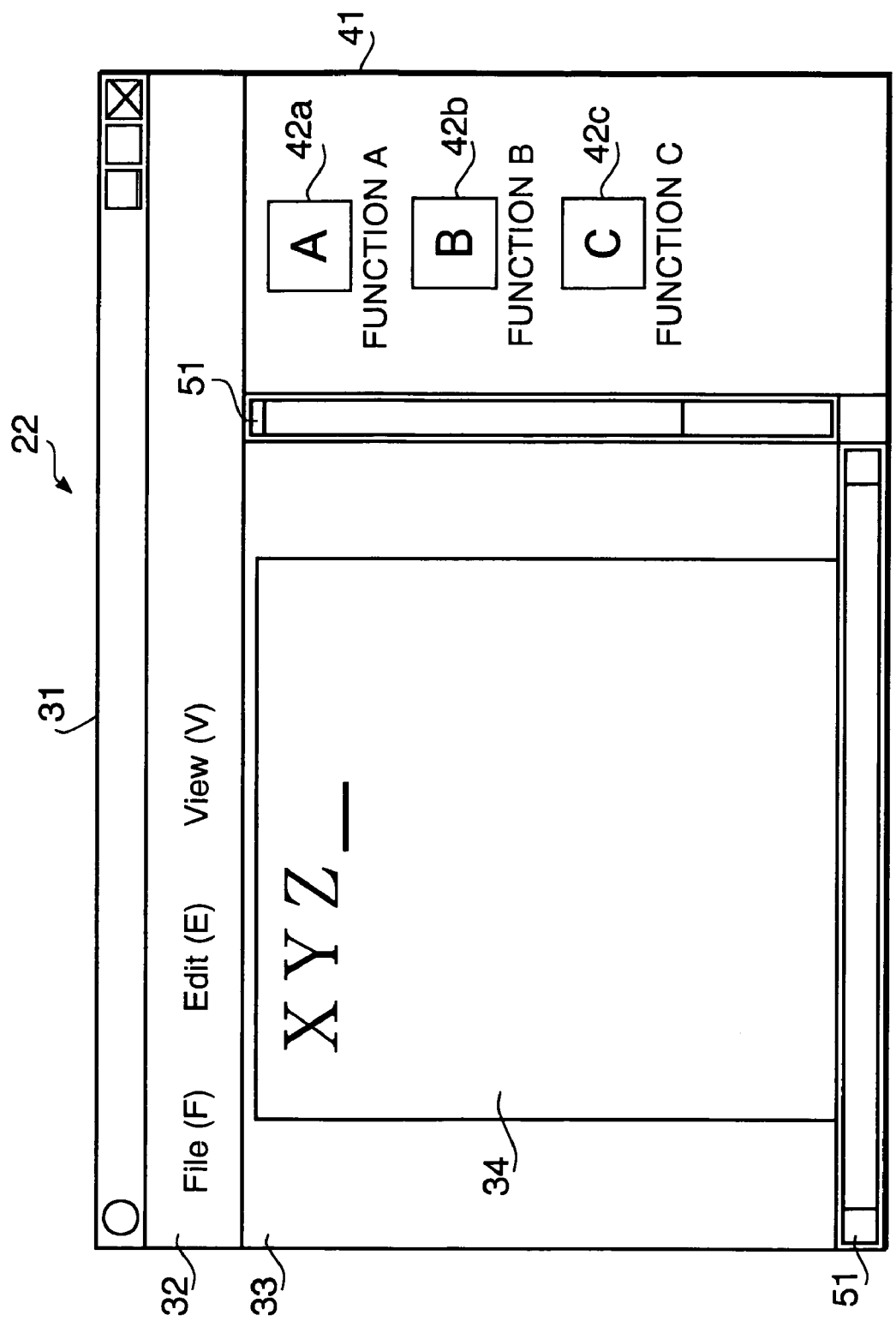
FIG. 4 shows an example of the operation screen of the editor activated on the PC of FIG. 1 when a change has been made to let the print area be long in the vertical direction.
Figure 5:
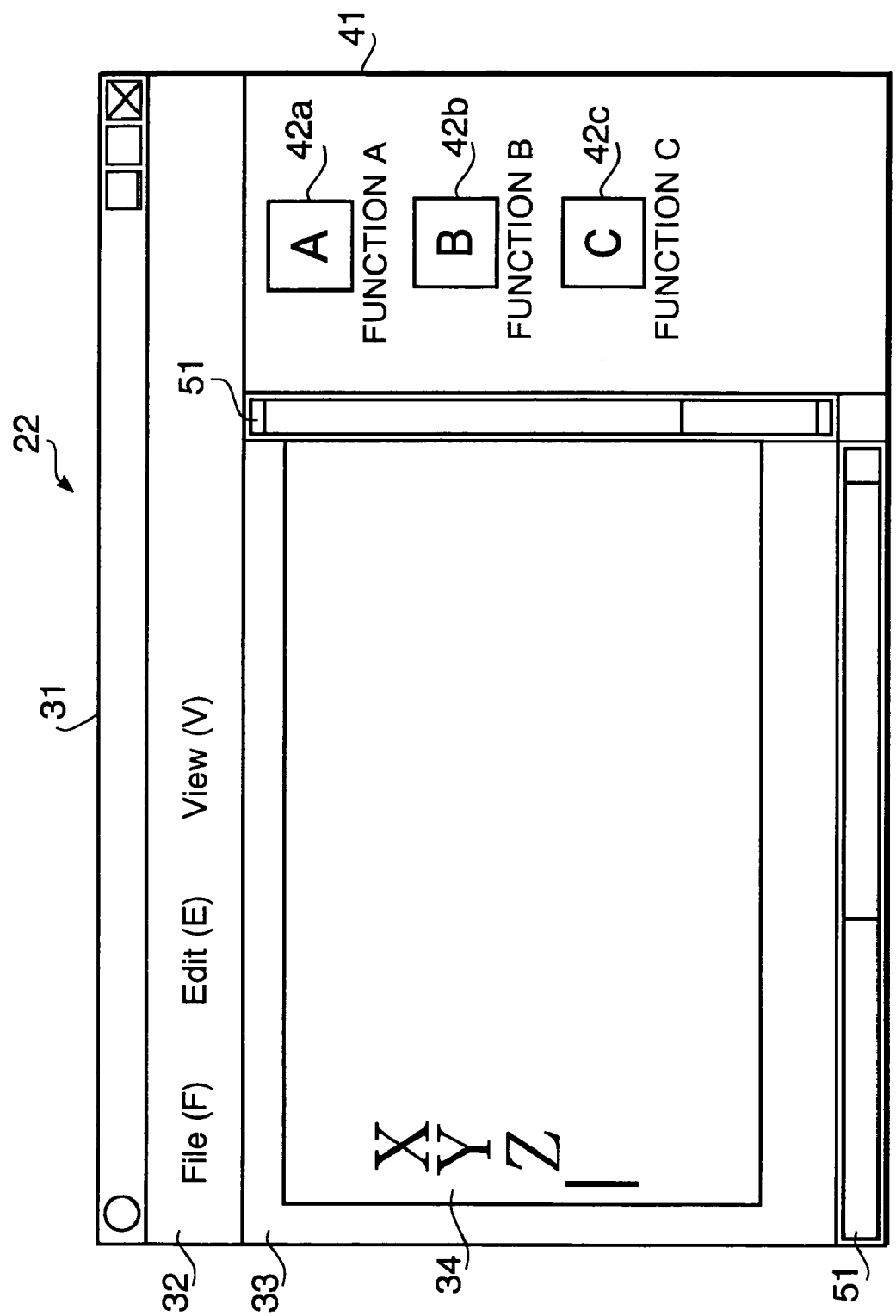
FIG. 5 shows an example of the operation screen of the editor activated on the PC of FIG. 1 when the direction of character input into an editing area has been changed to the vertical direction.

First, the "(1) automatic adjustment of pane configuration" will be explained referring to FIGS. 3-5. FIG. 3 shows an example of the operation screen when the arrangement direction of the print area 34 has been changed to let the print area 34 be wide in the horizontal direction. FIG. 4 shows an example of the operation screen when the arrangement direction of the print area 34 has been changed to let the print area 34 be long in the vertical direction. FIG. 5 shows an example of the operation screen when the direction of character input into the editing area 33 has been changed to the vertical direction. Incidentally, an example of the operation screen when the character input direction in the editing area 33 has been changed to the horizontal direction is shown in FIG. 3.

The "automatic adjustment of pane configuration" means changing of the configuration of the auxiliary area 41 (built in as a pane of the window 31) based on the result of the change of the status of the editing area 33 made by the user. The change of the status of the editing area 33 includes: (a) change of arrangement direction of the print area 34, and (b) change of character input direction in the editing area 33.

First, the automatic adjustment of pane configuration based on the result of the "(a) change of arrangement direction of the print area 34" will be explained. The "change of arrangement direction of the print area 34" means changing of the direction of the print area 34 being arranged in the editing area 33.

Specifically, in a state in which the auxiliary area 41 is being displayed in the pane display, when the arrangement direction of the print area 34 is changed by the user to let the print area 34 be wide in the horizontal direction, the configuration of the auxiliary area 41 is changed by the display status control function into pane display vertically partitioning the window 31 as shown in FIG. 3. In this auxiliary area 41, the function icons 42a-42c are also arranged in the horizontal direction. By the vertical arrangement of the editing area 33 and the auxiliary area 41 in the window 31, the viewable range of the print area 34 in the horizontal direction is enlarged as is clear from the comparison with FIG. 2.

In a state in which the auxiliary area 41 is being displayed in the pane display, when the arrangement direction of the print area 34 is changed by the user to let the print area 34 be long in the vertical direction, the configuration of the auxiliary area 41 is changed by the display status control function into pane display horizontally partitioning the window 31 as shown in FIG. 4. In this auxiliary area 41, the function icons 42a-42c are also arranged in the vertical direction. By the horizontal arrangement of the editing area 33 and the auxiliary area 41 in the window 31, the viewable range of the print area 34 in the vertical direction is enlarged as is clear from the comparison with FIG. 3. As a result, the operability and viewability of the editing area 33 can be improved.

Next, the automatic adjustment of pane configuration based on the result of the "(b) change of character input direction in the editing area 33" will be explained. The "change of character input direction in the editing area 33" means changing of the character input direction in the editing area 33 to the vertical direction or the horizontal direction.

Specifically, in a state in which the auxiliary area 41 is being displayed in the pane display, when the character input direction in the editing area 33 is changed by the user to the horizontal direction, the configuration of the auxiliary area 41 is changed by the display status control function into the pane display vertically partitioning the window 31 as shown in FIG. 3. In this auxiliary area 41, the function icons 42a-42c are arranged in the horizontal direction. By the vertical arrangement of the editing area 33 and the auxiliary area 41 in the window 31, the viewable range of the editing area 33 in the horizontal direction is enlarged as is clear from the comparison with FIG. 2.

In a state in which the auxiliary area 41 is being displayed in the pane display, when the character input direction in the editing area 33 is changed by the user to the vertical direction, the configuration of the auxiliary area 41 is changed by the display status control function into the pane display horizontally partitioning the window 31 as shown in FIG. 5. In this auxiliary area 41, the function icons 42a-42c are arranged in the vertical direction. By the horizontal arrangement of the editing area 33 and the auxiliary area 41 in the window 31, the viewable range of the editing area 33 in the vertical direction is enlarged as is clear from the comparison with FIG. 3. As a result, the character input into the editing area 33 is facilitated.

Figure 6:
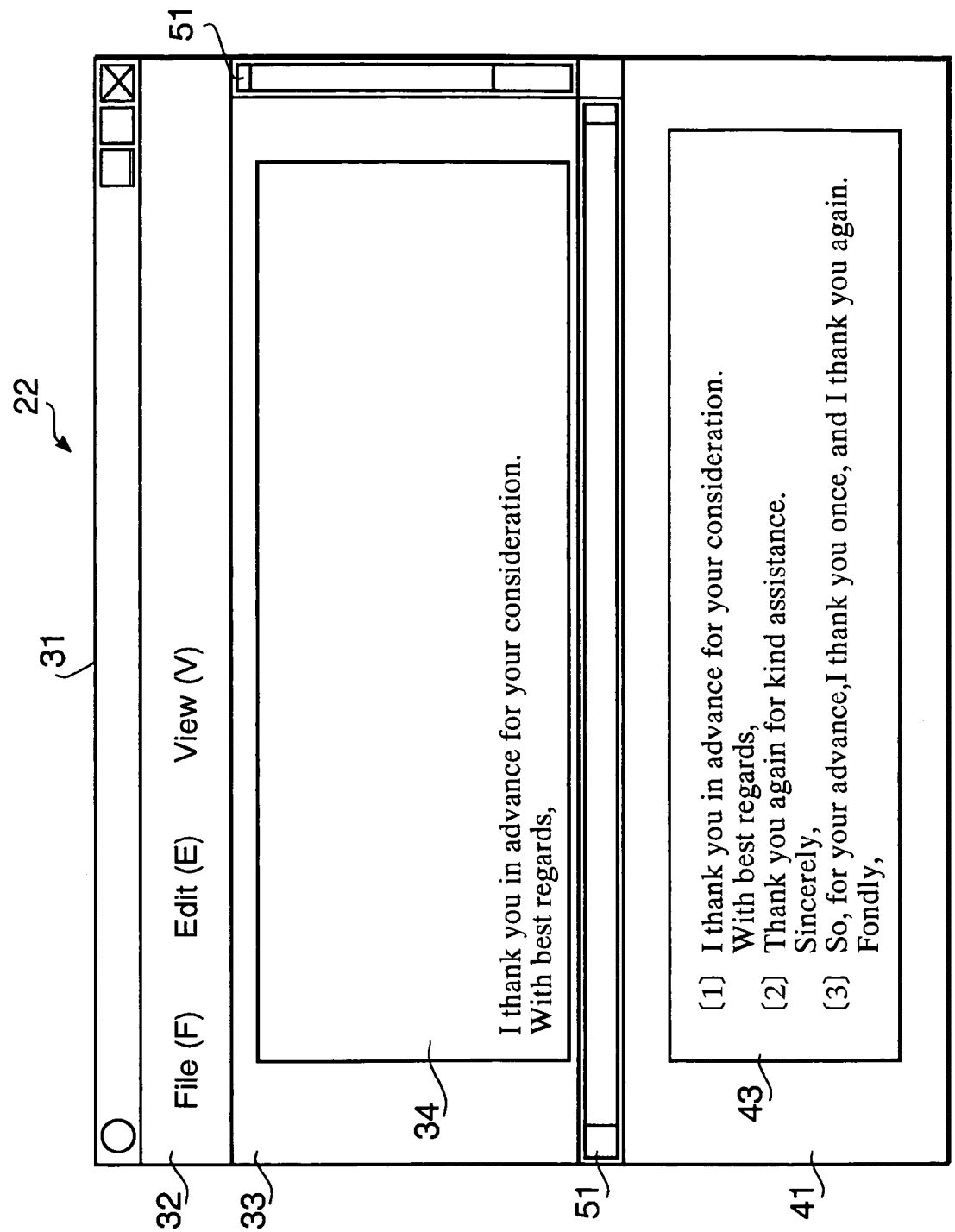
FIG. 6 shows an example of the operation screen of the editor activated on the PC of FIG. 1 when the character input direction in the editing area is changed to the horizontal direction when sample display has been placed in an auxiliary area.
Figure 7:
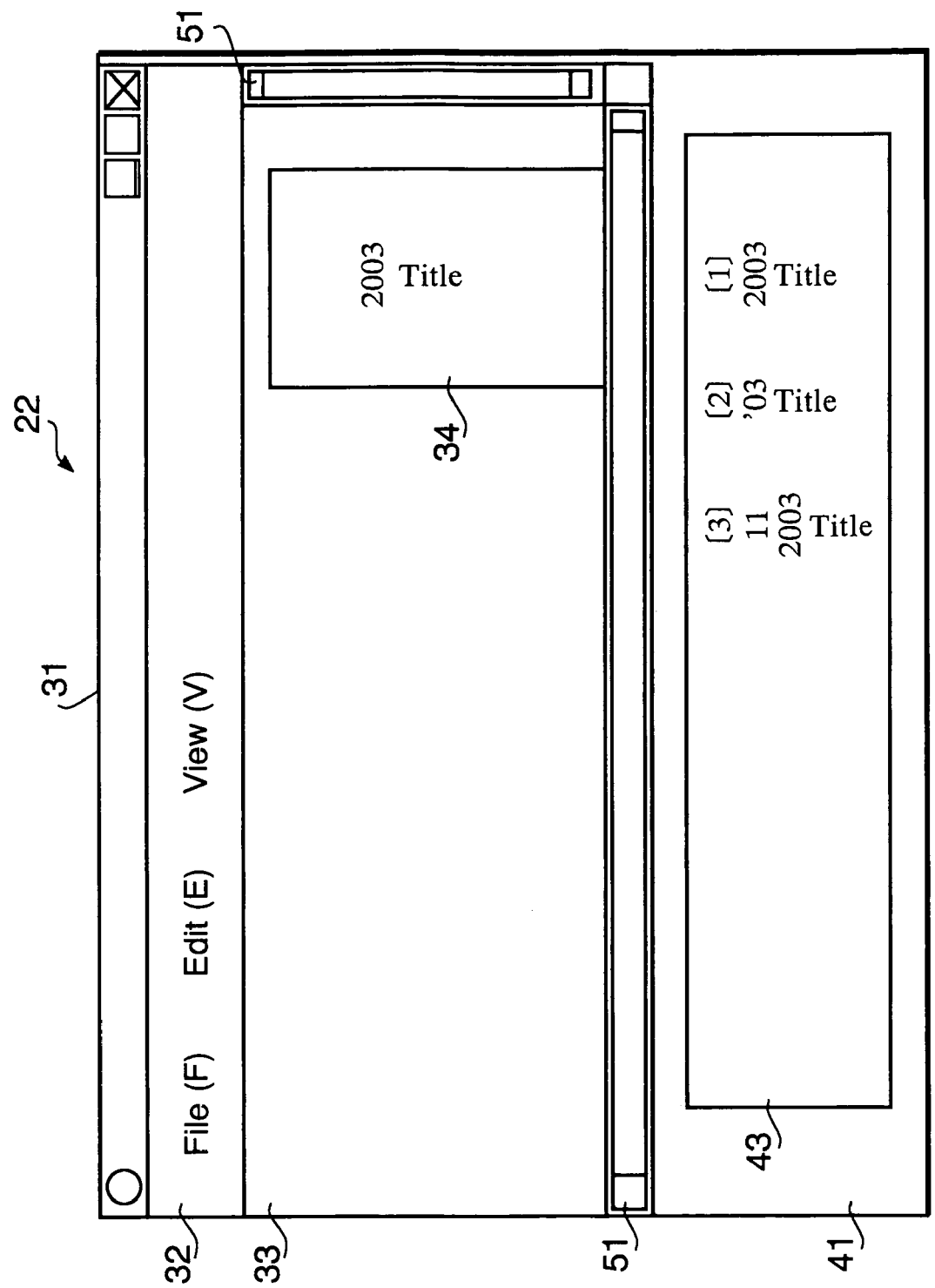
FIG. 7 shows an example of the operation screen of the editor activated on the PC of FIG. 1 when the character input direction in the editing area is changed to the vertical direction when sample display has been placed in the auxiliary area.

Next, the "(2) automatic adjustment of sample display" will be explained referring to FIGS. 6 and 7. FIG. 6 shows an example of the operation screen when the character input direction in the editing area 33 is changed to the horizontal direction when sample display 43 has been placed in the auxiliary area 41. FIG. 7 shows an example of the operation screen when the character input direction in the editing area 33 is changed to the vertical direction when sample display 43 has been placed in the auxiliary area 41.

The "automatic adjustment of sample display" means changing of the direction of display content of the sample display 43 placed in the auxiliary area 41 to the vertical direction or the horizontal direction based on the result of the change of the character input direction in the editing area 33 made by the user.

The "sample display 43" means a display area for displaying samples of content to be inputted to the editing area 33. The sample display 43 can be activated in the auxiliary area 41 by calling a sample display function from the menu bar 32. The user can select a desired sample from the samples displayed in the sample display 43 and input the selected sample to the editing area 33. For example, when the user calls a sample display function regarding greeting messages from the menu bar 32, samples of greeting messages are displayed in the sample display area 43.

Specifically, in a state in which the auxiliary area 41 is being displayed in the pane display, when the character input direction in the editing area 33 is changed by the user to the horizontal direction, the direction of the display content of the sample display 43 in the auxiliary area 41 is changed by the display status control function to the horizontal direction as shown in FIG. 6. By the automatic change of the direction of the display content of the sample display 43 into the horizontal direction (according to the character input direction of the editing area 33), the display content of the sample display 43 can be maintained in the same direction as the character input direction of the editing area 33.

In a state in which the auxiliary area 41 is being displayed in the pane display, when the character input direction in the editing area 33 is changed by the user to the vertical direction, the direction of the display content of the sample display 43 in the auxiliary area 41 is changed by the display status control function to the vertical direction as shown in FIG. 7. By the automatic change of the direction of the display content of the sample display 43 into the vertical direction (according to the character input direction of the editing area 33), the display content of the sample display 43 can be maintained in the same direction as the character input direction of the editing area 33. As a result, the user can make reference to the content of the sample display 43 more easily during the character input into the editing area 33.

Figure 8:
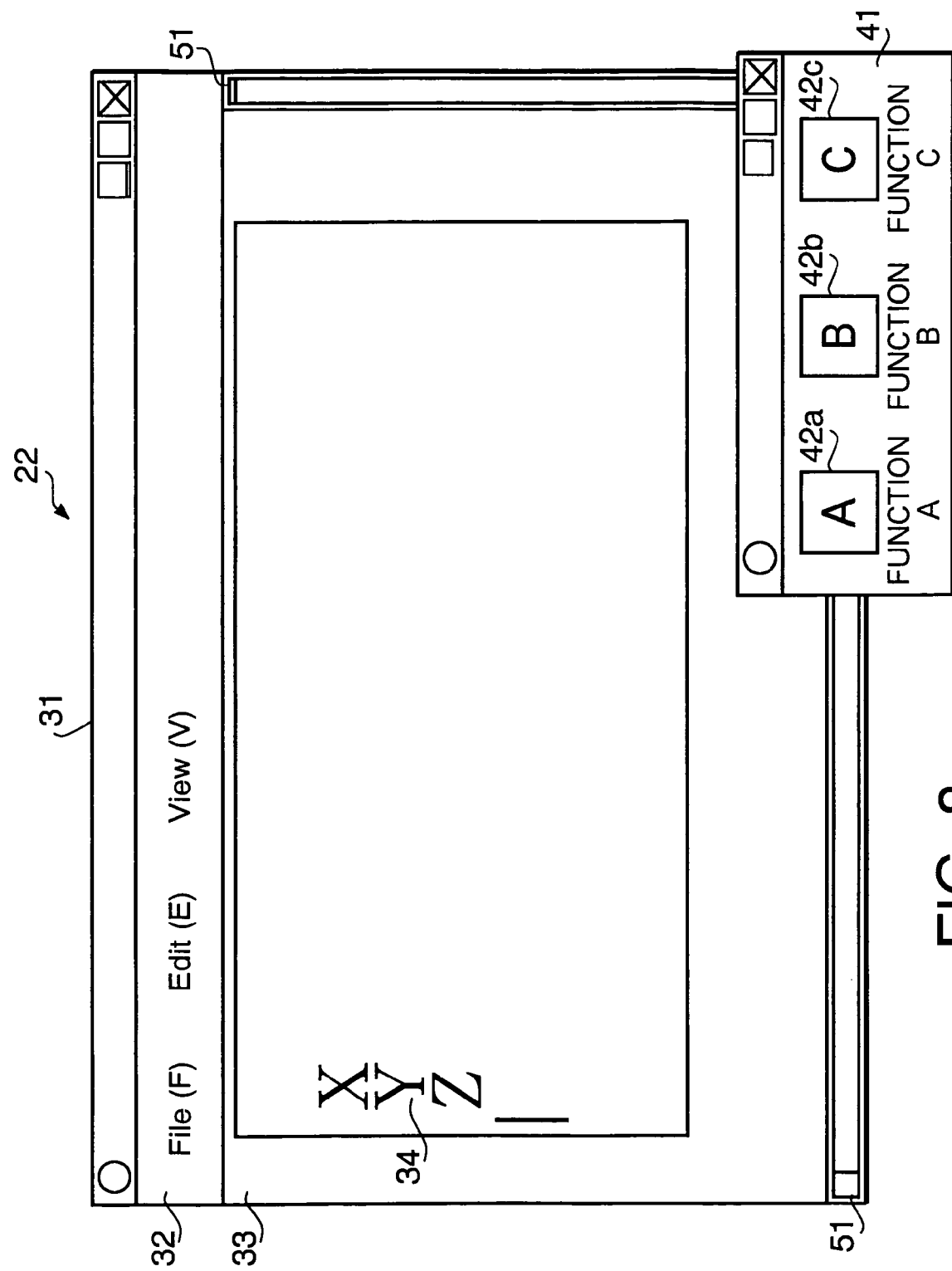
FIG. 8 shows an example of the operation screen of the editor activated on the PC of FIG. 1 when the display range of the editing area is enlarged when the auxiliary area has been displayed in pane display.

Next, the "(3) automatic switching between floating display and pane display" will be explained referring to FIG. 8. FIG. 8 shows an example of the operation screen when the display range of the editing area 33 is enlarged when the auxiliary area 41 has been displayed in the pane display.

The "automatic switching between floating display and pane display" means switching of the configuration of the auxiliary area 41 into the floating display (displaying the auxiliary area 41 as a window independent of the window 31) or the pane display (displaying the auxiliary area 41 as a pane built in the window 31) based on the result of a change of the display range of the editing area 33 made by the user.

Specifically, in a state in which the auxiliary area 41 is being displayed in the pane display as shown in FIGS. 2-7, when the display range of the editing area 33 is enlarged by the user to be larger than a prescribed range, the configuration of the auxiliary area 41 is switched by the display status control function to the floating display as shown in FIG. 8. When the configuration of the auxiliary area 41 is switched to the floating display as above, the display range of the auxiliary area 41 is automatically changed depending on the number of function icons 42a-42c being displayed in the auxiliary area 41. Consequently, the display range of the editing area 33 gets still larger when the number of function icons 42a-42c displayed in the auxiliary area 41 is small.

Further, the user can further enlarge the display range of the editing area 33 by moving the auxiliary area 41 being displayed in the floating display or further reducing the display range of the auxiliary area 41, by which the viewability and operability of the editing area 33 can be improved further.

In the state in which the auxiliary area 41 is being displayed in the floating display as shown in FIG. 8, when the display range of the editing area 33 is reduced by the user to be smaller than a prescribed range by dragging the outer frame of the window 31, the configuration of the auxiliary area 41 is switched by the display status control function to the pane display as shown in FIG. 5. As a result, the area used by the editor 22 gets smaller.

Figure 9:
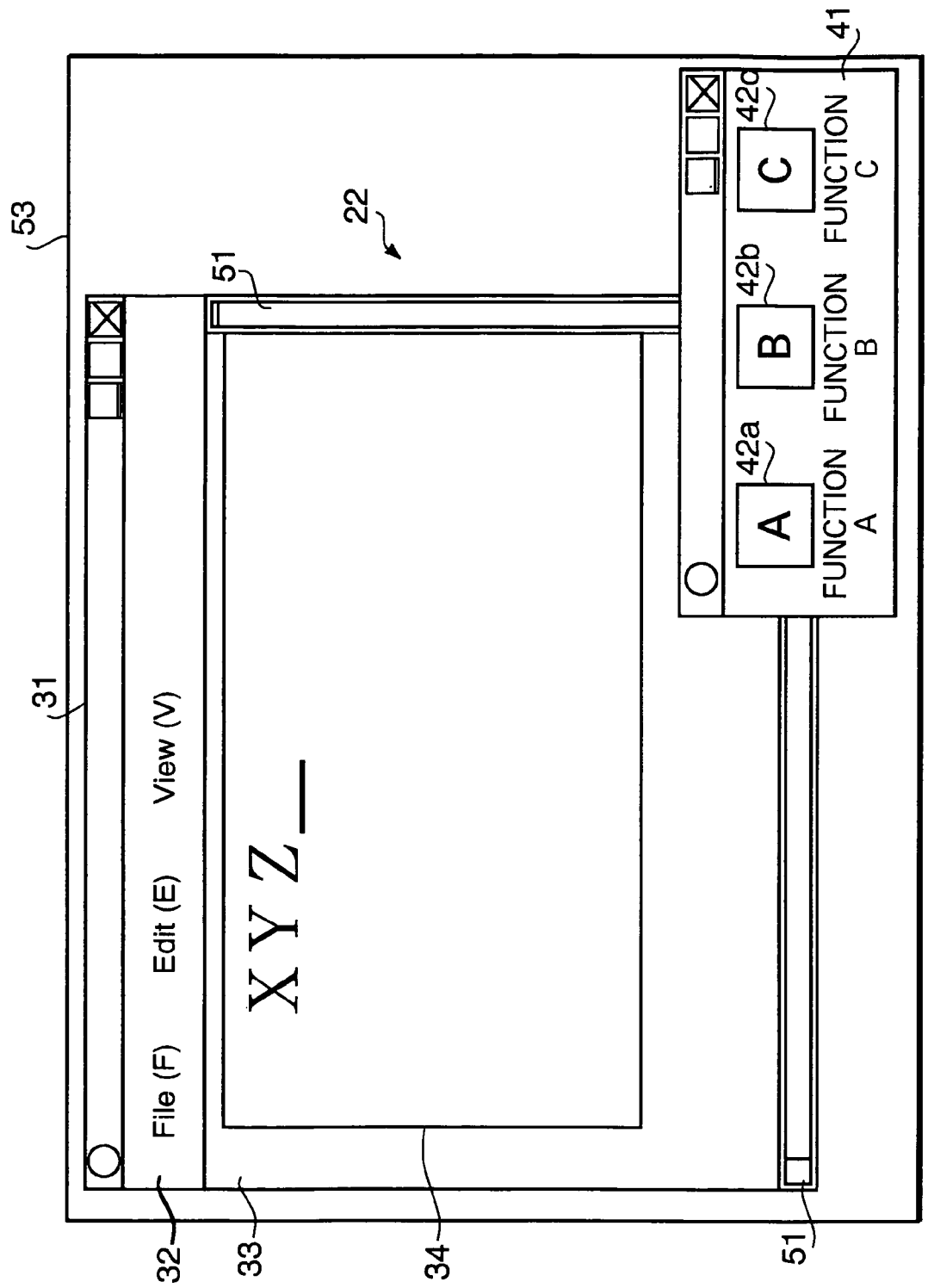
FIG. 9 shows an example of the operation screen of the editor activated on the PC of FIG. 1 when the auxiliary area has been displayed in floating display.
Figure 10:
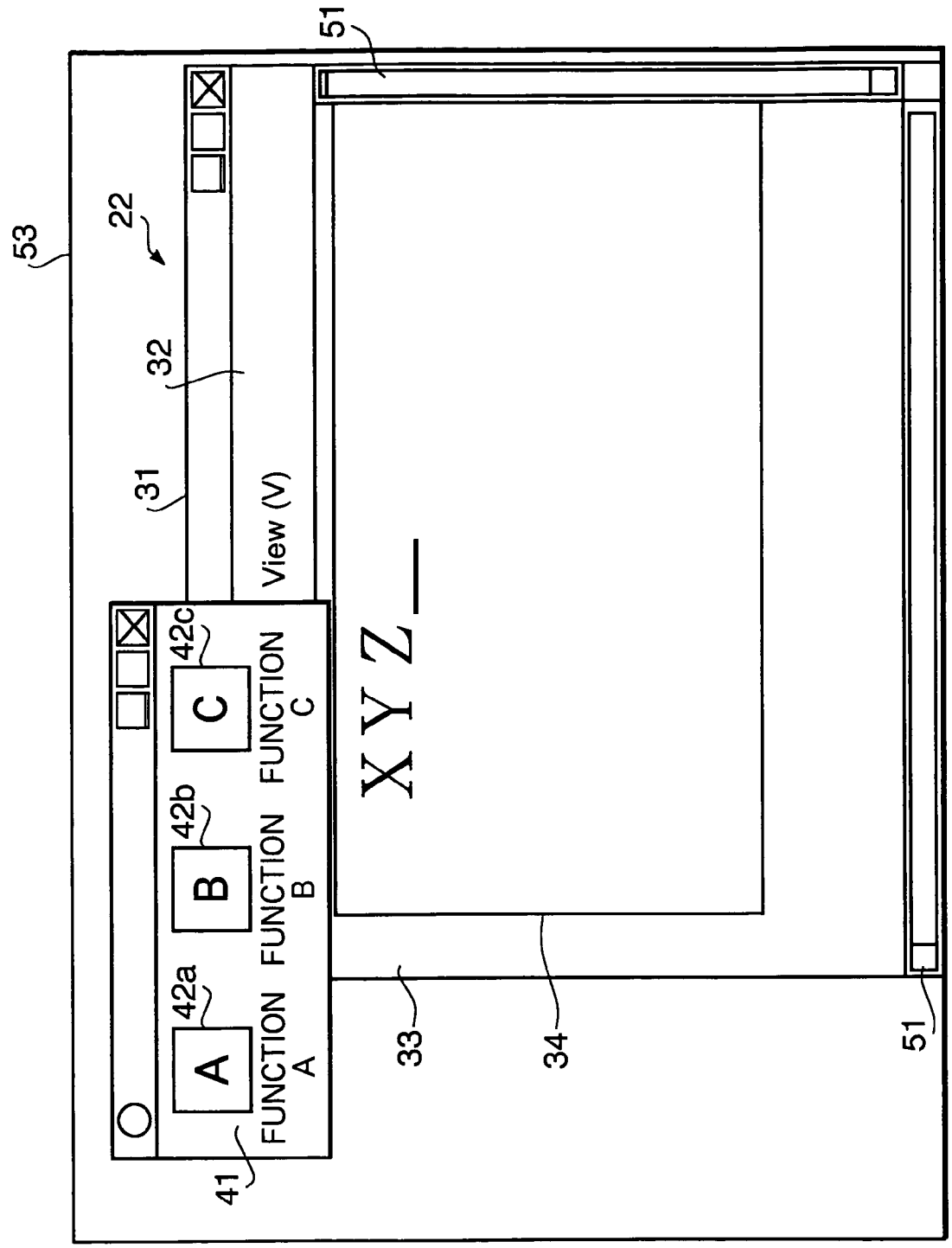
FIG. 10 shows another example of the operation screen of the editor activated on the PC of FIG. 1 when the auxiliary area has been displayed in the floating display.

Next, the "(4) automatic adjustment of floating position" will be explained referring to FIGS. 9 and 10. FIGS. 9 and 10 show examples of the operation screen on a screen 53 when the arrangement position of the editing area 34 is changed when the auxiliary area 41 has been displayed in the floating display.

The "automatic adjustment of floating position" means changing of the arrangement position of the auxiliary area 41 in the floating display so as to maximize the viewable range of the editing area 33 based on the result of the change of the arrangement position of the editing area 33 made by the user.

Specifically, in a state in which the auxiliary area 41 is being displayed in the floating display, when the editing area 33 is moved by the user to the upper left of the screen 53 together with the window 31, the arrangement position of the auxiliary area 41 is changed by the display status control function to the lower right of the screen 53 (to the opposite side of the window 31) as shown in FIG. 9. On the other hand, when the editing area 33 is moved by the user to the lower right of the screen 53 together with the window 31, the arrangement position of the auxiliary area 41 is changed by the display status control function to the upper left of the screen 53 (to the opposite side of the window 31) as shown in FIG. 10. As above, the arrangement position of the auxiliary area 41 is automatically adjusted by the display status control function so as to constantly maximize the viewable range of the editing area 33. As a result, the overlapping area between the auxiliary area 41 and the editing area 33 is reduced and the display range of the editing area 33 is enlarged, by which the viewability and operability of the editing area 33 can be maintained even when the editing area 33 is moved.

Figure 11:
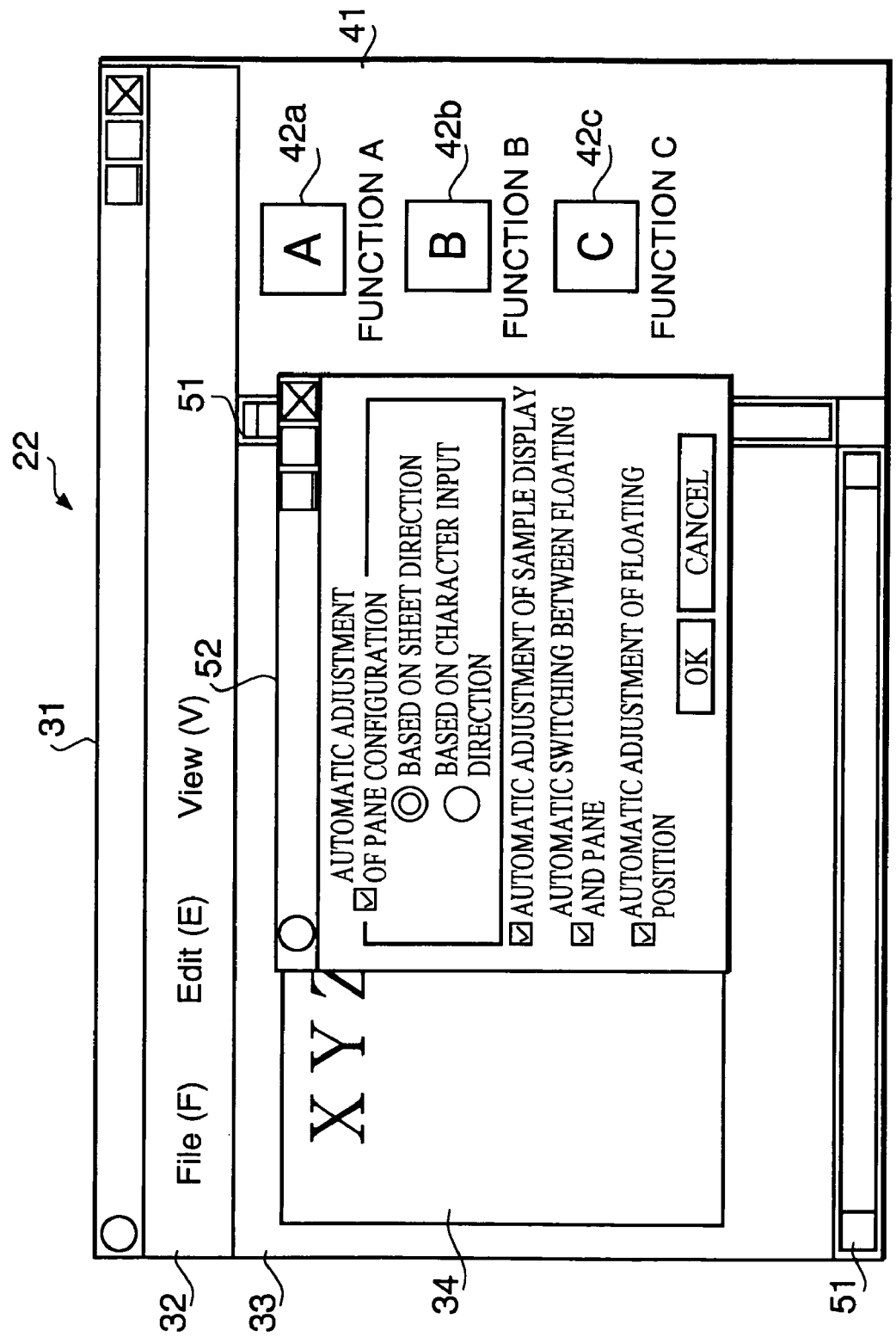
FIG. 11 is shows an example of the operation screen of the editor activated on the PC of FIG. 1 when a setting window for setting the contents of the display status control function has been activated.

Next, settings regarding the display status control function will be explained below referring to FIG. 11. FIG. 11 shows an example of the operation screen when a setting window 52 for setting the contents of the display status control function has been activated. A setting window 52 for the display status control function like the one shown in FIG. 11 is displayed when a function for setting the display status control function is called from the menu arranged in the menu bar 32. In the setting window 52, check boxes "AUTOMATIC ADJUSTMENT OF PANE CONFIGURATION", "AUTOMATIC ADJUSTMENT OF SAMPLE DISPLAY", "AUTOMATIC SWITCHING BETWEEN FLOATING AND PANE" and "AUTOMATIC ADJUSTMENT OF FLOATING POSITION" are arranged. When the check box "AUTOMATIC ADJUSTMENT OF PANE CONFIGURATION" is checked, radio buttons "BASED ON SHEET DIRECTION" and "BASED ON CHARACTER INPUT DIRECTION" are displayed in the frame.

By checking the check box "AUTOMATIC ADJUSTMENT OF PANE CONFIGURATION" and selecting the radio button "BASED ON SHEET DIRECTION", the display status control function is set to execute the aforementioned "(1)(a) automatic adjustment of pane configuration based on the change of arrangement direction of the print area 34". Meanwhile, by checking the check box "AUTOMATIC ADJUSTMENT OF PANE CONFIGURATION" and selecting the radio button "BASED ON CHARACTER INPUT DIRECTION", the display status control function is set to execute the aforementioned "(1)(b) automatic adjustment of pane configuration based on the change of character input direction in the editing area 33".

When the check box "AUTOMATIC ADJUSTMENT OF SAMPLE DISPLAY" is checked, the display status control function is set to execute the aforementioned "(2) automatic adjustment of sample display". When the check box "AUTOMATIC SWITCHING BETWEEN FLOATING AND PANE" is checked, the display status control function is set to execute the aforementioned "(3) automatic switching between floating display and pane display". When the check box "AUTOMATIC ADJUSTMENT OF FLOATING POSITION" is checked, the display status control function is set to execute the aforementioned "(4) automatic adjustment of floating position".

As above, the user can change the contents of the display status control function freely by changing the settings in the setting window 52, by which the adjustment of the configuration, display content and arrangement position of the auxiliary area 41 can be set according to the intention of the user.

Figure 12:
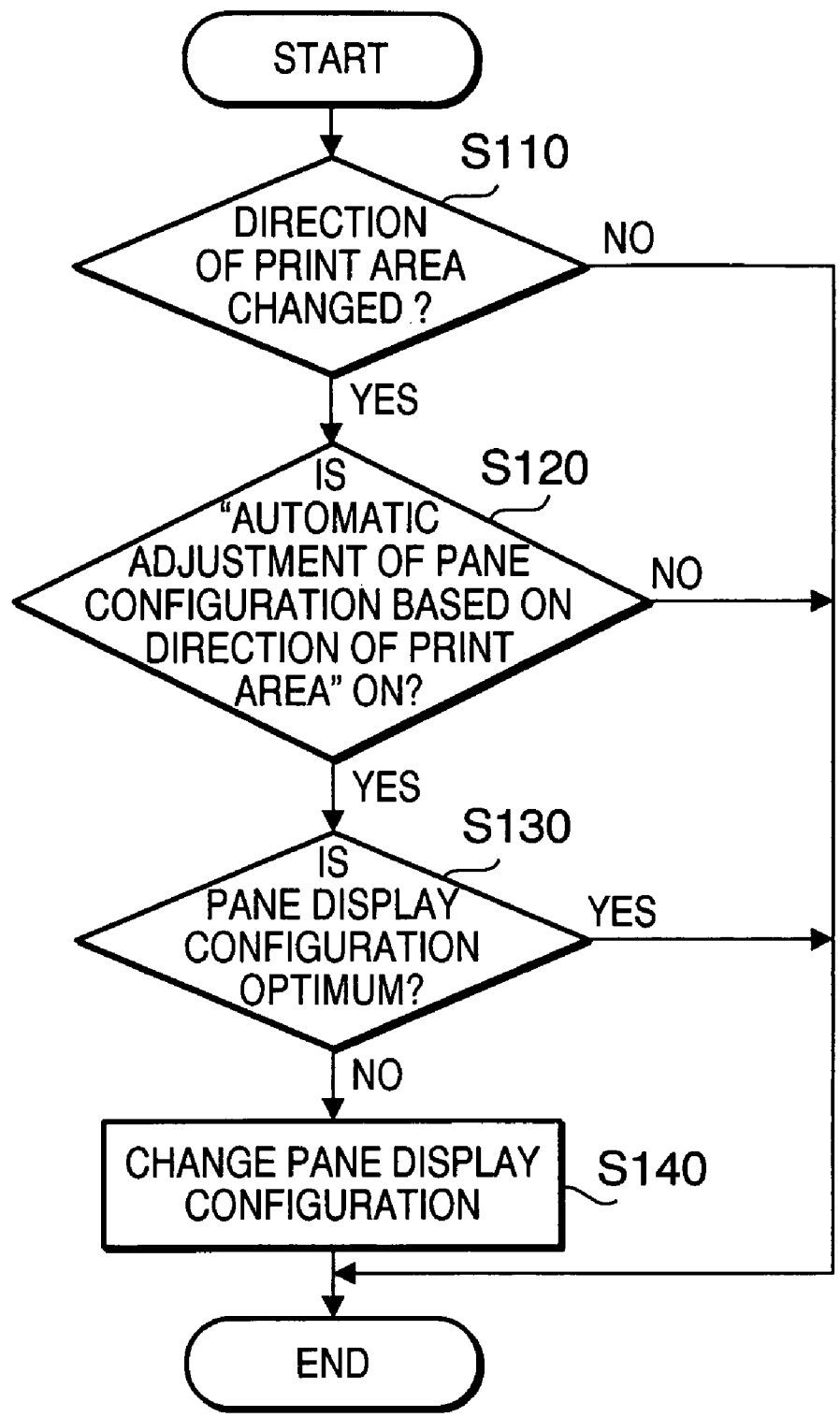
FIG. 12 is a flow chart showing a process executed by the editor activated on the PC of FIG. 1 for automatic adjustment of pane configuration based on the change of arrangement direction of the print area.
Figure 13:
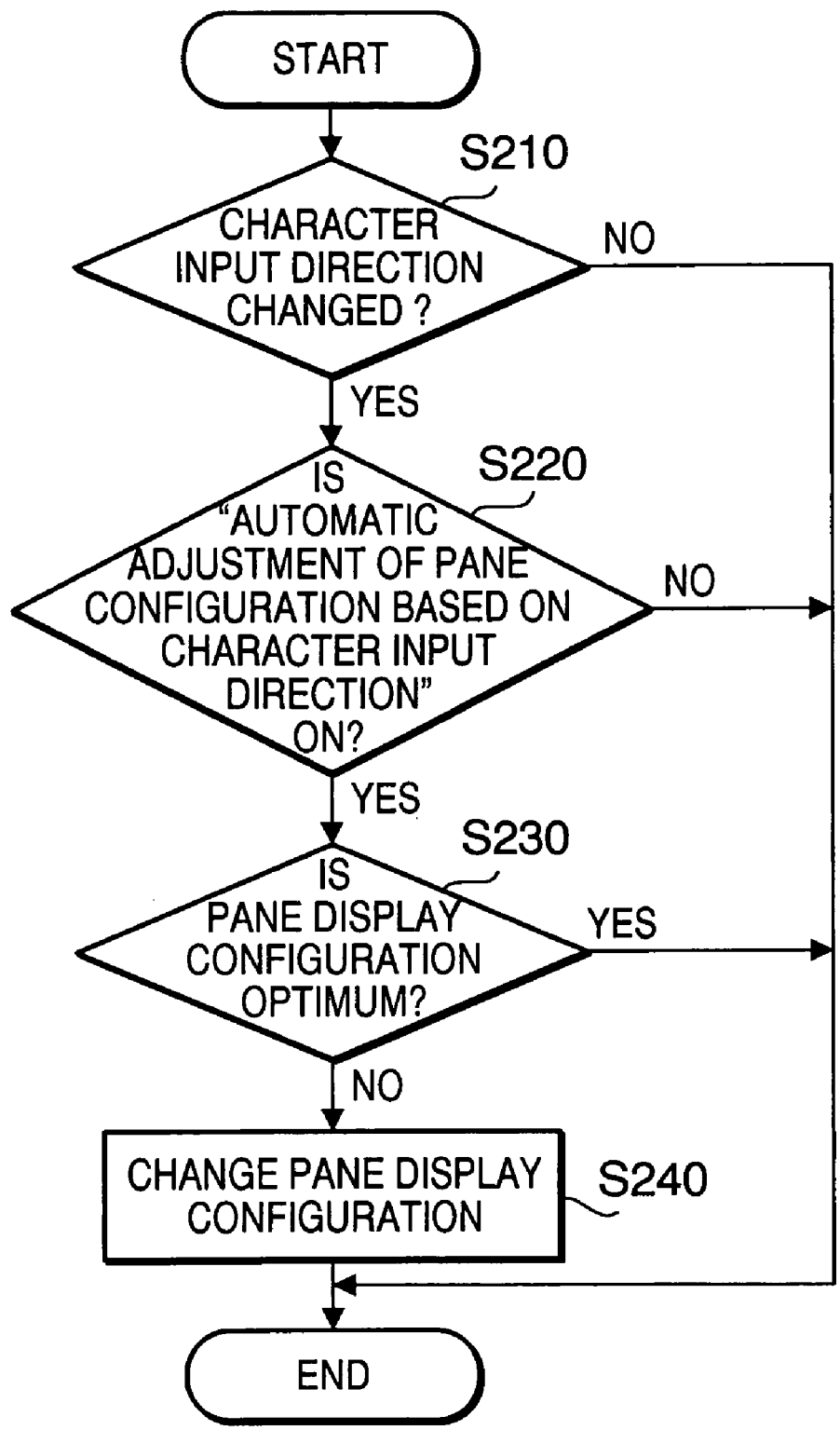
FIG. 13 is a flow chart showing a process executed by the editor activated on the PC of FIG. 1 for the automatic adjustment of the pane configuration based on the change of the character input direction in the editing area.
Figure 14:
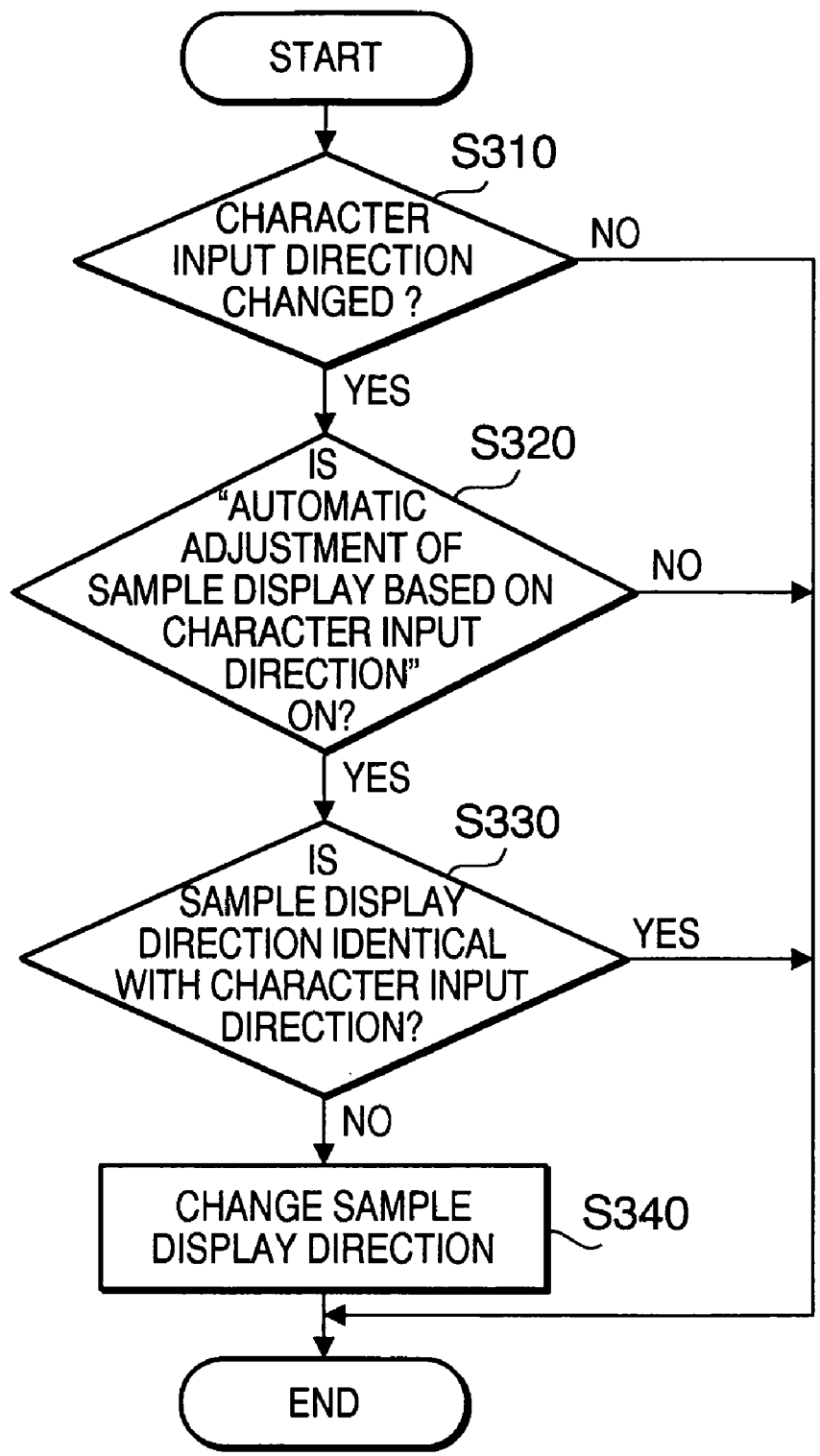
FIG. 14 is a flow chart showing a process executed by the editor activated on the PC of FIG. 1 for automatic adjustment of the sample display.
Figure 15:
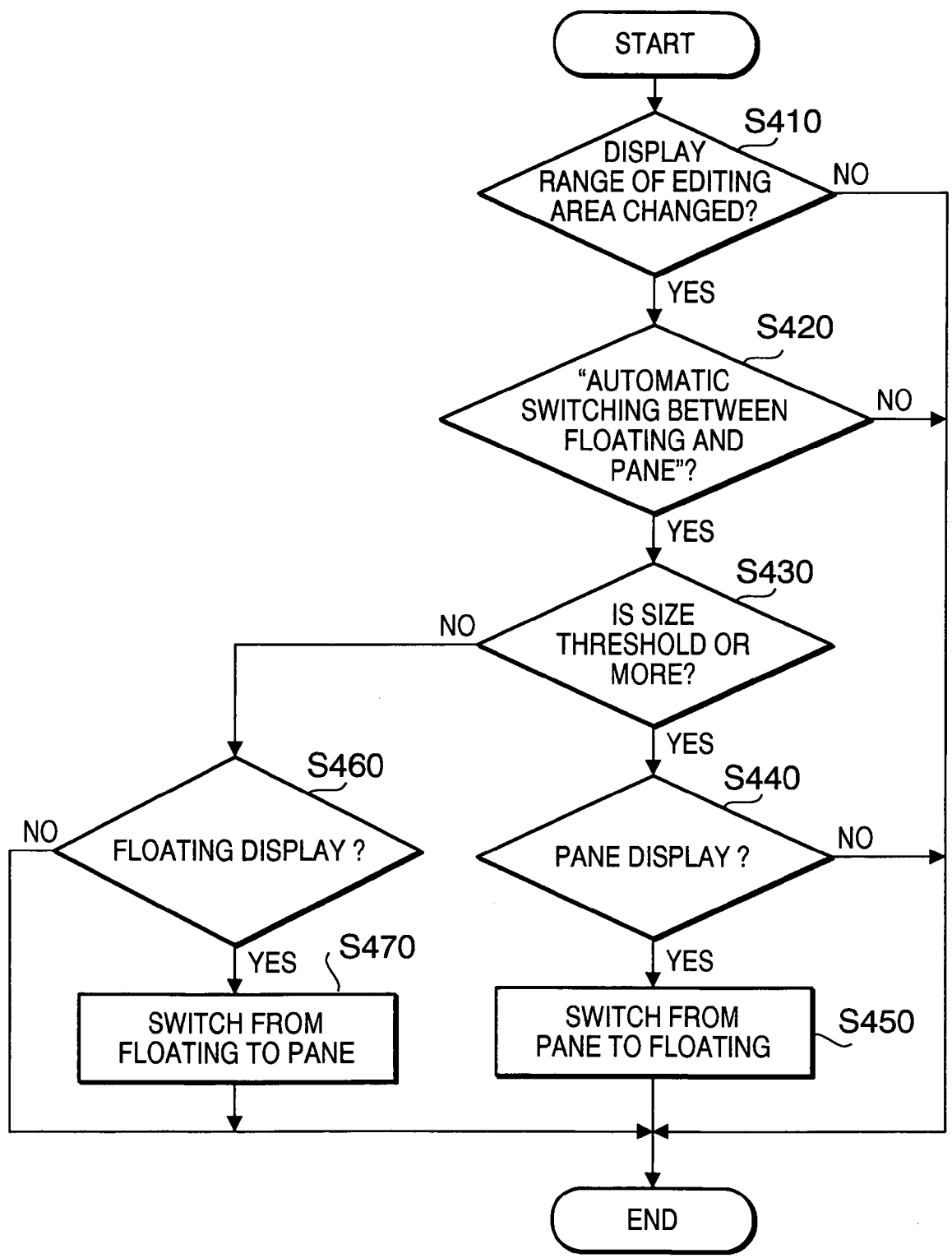
FIG. 15 is a flow chart showing a process executed by the editor activated on the PC of FIG. 1 for automatic switching between the floating display and pane display.
Figure 16:
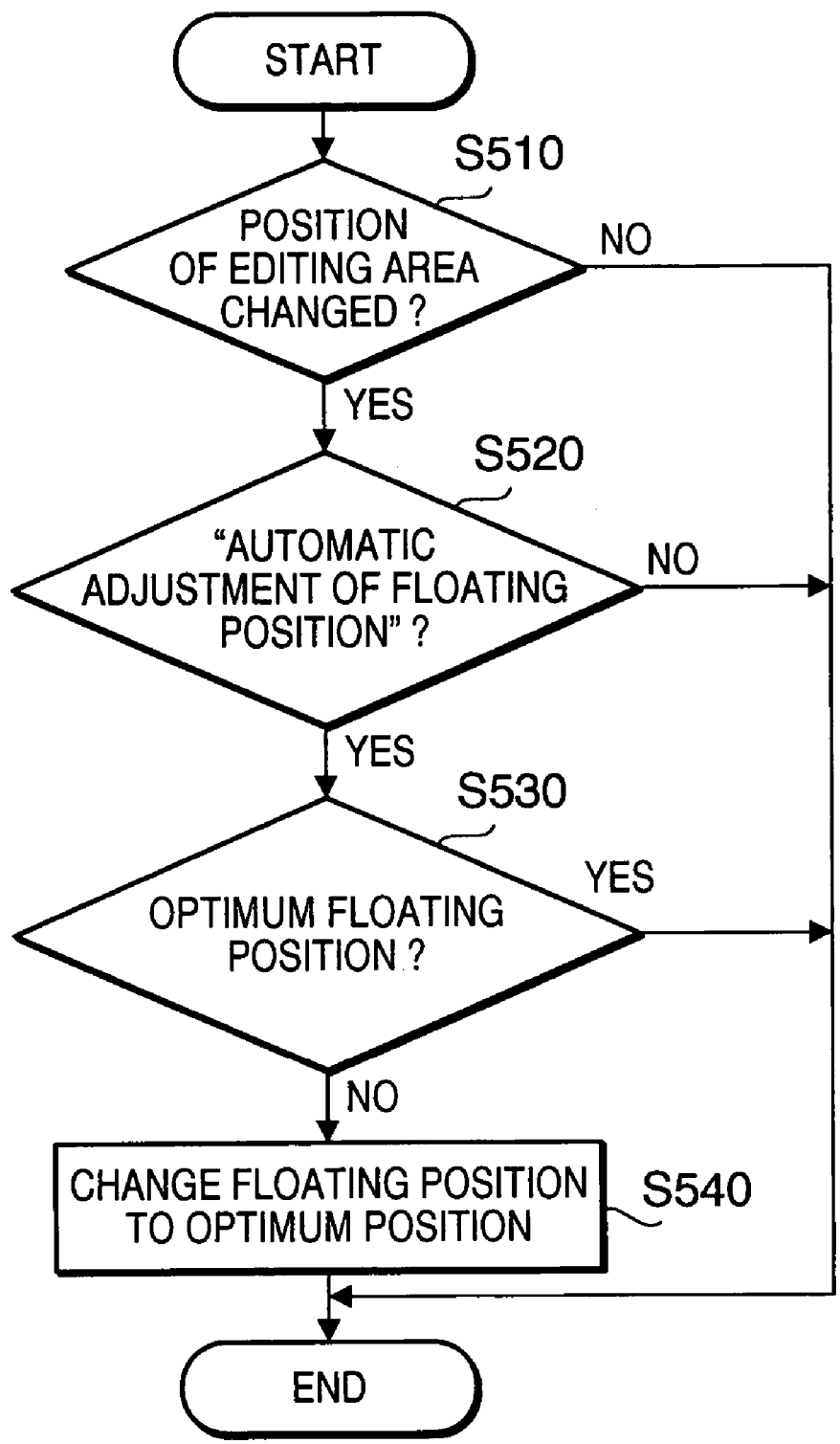
FIG. 16 is a flow chart showing a process executed by the editor activated on the PC of FIG. 1 for automatic adjustment of floating position.

Next, processes executed for the display status control function will be described below referring to FIGS. 12-16. FIG. 12 is a flow chart showing a process for the automatic adjustment of the pane configuration based on the change of the arrangement direction of the print area 34. FIG. 13 is a flow chart showing a process for the automatic adjustment of the pane configuration based on the change of the character input direction in the editing area 33. FIG. 14 is a flow chart showing a process for the automatic adjustment of the sample display. FIG. 15 is a flow chart showing a process for the automatic switching between the floating display and pane display. FIG. 16 is a flow chart showing a process for the automatic adjustment of the floating position. The processes shown in FIGS. 12-16 are called at prescribed intervals while the editor 22 is operating and executed under the control by the CPU 2.

First, the process for the "(1)(a) automatic adjustment of pane configuration based on the change of arrangement direction of the print area 34" will be described below. As shown in FIG. 12, the process advances to step S110 (hereinafter abbreviated as "S110", ditto for the following steps) and whether the direction of the print area 34 has been changed by the user in the state in which the auxiliary area 41 is being displayed in the pane display or not is judged. If the direction of the print area 34 has not been changed (S110: NO), the process of FIG. 12 is ended.

If the direction of the print area 34 has been changed (S110: YES), the process advances to S120 and whether the setting for executing the "automatic adjustment of pane configuration based on the change of arrangement direction of the print area 34" has been made through the setting window 52 or not is judged. If the setting has not been made (S120: NO), the process of FIG. 12 is ended.

If the setting for executing the "automatic adjustment of pane configuration based on the change of arrangement direction of the print area 34" has been made (S120: YES), the process advances to S130 and whether the auxiliary area 41 in the pane display is being displayed in an optimum configuration or not is judged. Specifically, in cases where the arrangement direction of the print area 34 has been changed by the user to let the print area 34 be wide in the horizontal direction, the auxiliary area 41 in the pane display is judged to be being displayed in the optimum configuration if the auxiliary area 41 is in the pane display vertically partitioning the window 31. In cases where the arrangement direction of the print area 34 has been changed by the user to let the print area 34 be long in the vertical direction, the auxiliary area 41 in the pane display is judged to be being displayed in the optimum configuration if the auxiliary area 41 is in the pane display horizontally partitioning the window 31.

If the auxiliary area 41 in the pane display is being displayed in the optimum configuration (S130: YES), the process of FIG. 12 is ended. If the auxiliary area 41 in the pane display is not being displayed in the optimum configuration (S130: NO), the process advances to S140 and the pane display of the auxiliary area 41 is changed to the aforementioned optimum configuration. Thereafter, the process of FIG. 12 is ended.

Next, the process for the "(1)(b) automatic adjustment of pane configuration based on the change of character input direction in the editing area 33" will be described below. Referring to FIG. 13, in the first S210, whether the character input direction in the editing area 33 has been changed by the user in the state in which the auxiliary area 41 is being displayed in the pane display or not is judged. If the character input direction in the editing area 33 has not been changed (S210: NO), the process of FIG. 13 is ended. If the character input direction in the editing area 33 has been changed (S210: YES), the process advances to S220 and whether the setting for executing the "automatic adjustment of pane configuration based on the change of character input direction in the editing area 33" has been made by the user through the setting window 52 or not is judged. If the setting has not been made (S220: NO), the process of FIG. 13 is ended.

If the setting for executing the "automatic adjustment of pane configuration based on the change of character input direction in the editing area 33" has been made (S220: YES), the process advances to S230 and whether the auxiliary area 41 in the pane display is being displayed in an optimum configuration or not is judged. Specifically, in cases where the character input direction in the print area 34 has been changed by the user to the horizontal direction, the auxiliary area 41 in the pane display is judged to be being displayed in the optimum configuration if the auxiliary area 41 is in the pane display vertically partitioning the window 31. In cases where the character input direction in the print area 34 has been changed by the user to the vertical direction, the auxiliary area 41 in the pane display is judged to be being displayed in the optimum configuration if the auxiliary area 41 is in the pane display horizontally partitioning the window 31.

If the auxiliary area 41 in the pane display is being displayed in the optimum configuration (S230: YES), the process of FIG. 13 is ended. If the auxiliary area 41 in the pane display is not being displayed in the optimum configuration (S230: NO), the process advances to S240 and the pane display of the auxiliary area 41 is changed to the aforementioned optimum configuration. Thereafter, the process of FIG. 13 is ended.

Next, the process for the "(2) automatic adjustment of sample display" will be described below. Referring to FIG. 14, in the first S310, whether the character input direction in the editing area 33 has been changed by the user in the state in which the auxiliary area 41 is being displayed in the pane display or not is judged. If the character input direction in the editing area 33 has not been changed (S310: NO), the process of FIG. 14 is ended. If the character input direction in the editing area 33 has been changed (S310: YES), the process advances to S320 and whether the setting for executing the "automatic adjustment of sample display" has been made by the user through the setting window 52 or not is judged. If the setting has not been made (S320: NO), the process of FIG. 14 is ended.

If the setting for executing the "automatic adjustment of sample display" has been made (S320: YES), the process advances to S330 and whether the direction of the display content of the sample display 43 is identical with the character input direction in the print area 34 which has been changed by the user or not is judged. Specifically, whether the direction of the display content of the sample display 43 is the horizontal/vertical direction or not is judged when the character input direction in the print area 34 changed by the user is the horizontal/vertical direction. If the direction of the display content of the sample display 43 is identical with the character input direction in the print area 34 (S330: YES), the process of FIG. 14 is ended. If the two directions are not identical with each other (S330: NO), the process advances to S340 and the direction of the display content of the sample display 34 is changed to be identical with the character input direction in the print area 34. Thereafter, the process of FIG. 14 is ended.

Next, the process for the "(3) automatic switching between floating display and pane display" will be described below. Referring to FIG. 15, in the first S410, whether the display range of the editing area 33 has been changed by the user or not is judged. If the display range of the editing area 33 has not been changed (S410: NO), the process of FIG. 15 is ended. If the display range of the editing area 33 has been changed (S410: YES), the process advances to S420, in which whether the setting for executing the "automatic switching between floating display and pane display" has been made by the user operation through the setting window 52 or not is judged. If the setting has not been made (S420: NO), the process of FIG. 15 is ended.

If the setting for executing the "automatic switching between floating display and pane display" has been made (S420: YES), the process advances to S430 and whether or not the display range of the editing area 33 changed by the user is a prescribed threshold value or more is judged. While the threshold value can be changed freely by the user, the threshold value may also be fixed as an invariable value. If the display range of the editing area 33 changed by the user is the prescribed threshold value or more (S430: YES), the process advances to S440 and whether the auxiliary area 41 is in the pane display or not is judged.

If the auxiliary area 41 is not in the pane display (S440: NO), the process of FIG. 15 is ended. If the auxiliary area 41 is in the pane display (S440: YES), the process advances to S450 and the configuration of the auxiliary area 41 is changed to the floating display. Thereafter, the process of FIG. 15 is ended.

If the display range of the editing area 33 changed by the user is smaller than the prescribed threshold value in S430 (S430: NO), the process advances to S460 and whether the auxiliary area 41 is in the floating display or not is judged. If the auxiliary area 41 is not in the floating display (S460: NO), the process of FIG. 15 is ended. If the auxiliary area 41 is in the floating display (S460: YES), the process advances to S470 and the configuration of the auxiliary area 41 is changed to the pane display. Thereafter, the process of FIG. 15 is ended.

Next, the process for the "(4) automatic adjustment of floating position" will be described below. Referring to FIG. 16, in the first S510, whether the arrangement position of the editing area 33 has been changed by the user in the state in which the auxiliary area 41 is being displayed in the floating display or not is judged. If the arrangement position of the editing area 33 has not been changed (S510: NO), the process of FIG. 16 is ended. If the arrangement position of the editing area 33 has been changed (S510: YES), the process advances to S520, in which whether the setting for executing the "automatic adjustment of floating position" has been made by the user through the setting window 52 or not is judged. If the setting has not been made (S520: NO), the process of FIG. 16 is ended.

If the setting for executing the "automatic adjustment of floating position" has been made (S520: YES), the process advances to S530 and whether the arrangement position of the auxiliary area 41 in the floating display is a position maximizing the viewable range of the editing area 33 or not is judged. If the arrangement position of the auxiliary area 41 is a position maximizing the viewable range of the editing area 33 (S530: YES), the process of FIG. 16 is ended. If the arrangement position is not a position maximizing the viewable range of the editing area 33 (S530: NO), the process advances to S540, in which the arrangement position of the auxiliary area 41 is changed to a position maximizing the viewable range of the editing area 33. Thereafter, the process of FIG. 16 is ended.

As described above, according to this embodiment, at least one of the configuration, display content and arrangement position of the auxiliary area 41 is changed based on the status of the editing area 33, by which the viewability and operability of the editor 22 are improved.

While a description has been given above of a preferred embodiment in accordance with the present invention, the present invention is not to be restricted by the particular illustrative embodiment and a variety of modification, design changes, etc. are possible without departing from the scope and spirit of the present invention described in the appended claims. For example, while the display control device in the above embodiment is implemented by functions of application software which is activated on an OS, the display control device may also be implemented by a control program or purpose-built hardware of the device.

While the configuration, display content and arrangement position of the auxiliary area 41 are selectively controlled based on the result of control of the editing area 33 in the above embodiment, the display control device may also be configured to control only one or two of the configuration, display content and arrangement position of the auxiliary area 41 based on the result of control of the editing area 33. It is also possible to simultaneously control two or more of the configuration, display content and arrangement position of the auxiliary area 41 based on the control result of the editing area 33.

While display direction of the sample display 43 is changed based on the character input direction in the editing area 33 in the above embodiment, an embodiment changing display direction of all the display content of the auxiliary area 41 based on the character input direction in the editing area 33 is also possible.

While the contents of the display status control function can be set freely in the above embodiment, a configuration allowing the setting of part of the contents of the display status control function can also be implemented. Further, a configuration fixing the contents of the display status control function and allowing no user setting is also possible.

In a display control device in accordance with an embodiment of the present invention, the second control means may control the configuration of the second display area to be wide in the horizontal direction when the configuration or the display content of the first display area is controlled by first control means to be wide in the horizontal direction, while controlling the configuration of the second display area to be long in the vertical direction when the configuration or the display content of the first display area is controlled by the first control means to be long in the vertical direction.

By the above configuration, the configuration of the second display area is set based on the configuration of the first display area, by which the operability and viewability of the first display area can be improved.

In a program in accordance with an embodiment of the present invention, the second control means may control the configuration of the second display area to be wide in the horizontal direction when the configuration or the display content of the first display area is controlled by first control means to be wide in the horizontal direction, while controlling the configuration of the second display area to be long in the vertical direction when the configuration or the display content of the first display area is controlled by the first control means to be long in the vertical direction.

By the above configuration, the configuration of the second display area is set based on the configuration of the first display area, by which the operability and viewability of the first display area can be improved.

In a display control device in accordance with an embodiment of the present invention, the second control means may control the configuration of the second display area to be wide in the horizontal direction when the character input direction in the first display area is set by the first control means to the horizontal direction, while controlling the configuration of the second display area to be long in the vertical direction when the character input direction in the first display area is set by the first control means to the vertical direction.

By the above configuration, the configuration of the second display area is set based on the character input direction in the first display area, by which the character input into the first display area is made easier.

In a program in accordance with an embodiment of the present invention, the second control means may control the configuration of the second display area to be wide in the horizontal direction when the character input direction in the first display area is set by the first control means to the horizontal direction, while controlling the configuration of the second display area to be long in the vertical direction when the character input direction in the first display area is set by the first control means to the vertical direction.

By the above configuration, the configuration of the second display area is set based on the character input direction in the first display area, by which the character input into the first display area is made easier.

In a display control device in accordance with an embodiment of the present invention, the second control means may control the display content of the second display area to be in a horizontal direction when the character input direction in the first display area is set by the first control means to the horizontal direction, while controlling the display content of the second display area to be in a vertical direction when the character input direction in the first display area is set by the first control means to the vertical direction.

By the above configuration, display direction of the content of the second display area is set based on the character input direction in the first display area, by which the user can refer to the display content of the second display area easily during the character input into the first display area.

In a program in accordance with an embodiment of the present invention, the second control means may control the display content of the second display area to be in a horizontal direction when the character input direction in the first display area is set by the first control means to the horizontal direction, while controlling the display content of the second display area to be in a vertical direction when the character input direction in the first display area is set by the first control means to the vertical direction.

By the above configuration, display direction of the content of the second display area is set based on the character input direction in the first display area, by which the user can refer to the display content of the second display area easily during the character input into the first display area.

In a display control device in accordance with an embodiment of the present invention, in cases where the second display area has been built in the first display area, the second control means may control the configuration of the second display area to let the second display area be a display area independent of the first display area when the first display area is enlarged by the first control means.

By the above configuration, the second display area is separated from the first display area depending on the size of the first display area, by which the viewability and operability of the first display area can be improved further.

In a program in accordance with an embodiment of the present invention, in cases where the second display area has been built in the first display area, the second control means may control the configuration of the second display area to let the second display area be a display area independent of the first display area when the first display area is enlarged by the first control means.

By the above configuration, the second display area is separated from the first display area depending on the size of the first display area, by which the viewability and operability of the first display area can be improved further.

In a display control device in accordance with an embodiment of the present invention, in cases where the second display area is a display area independent of the first display area, the second control means may change the arrangement position of the second display area to an area without the first display area when the first display area is moved by the first control means.

By the above configuration, the arrangement position of the second display area is set based on the position of the first display area after the movement in the case where the second display area is independent of the first display area, by which the viewability and operability of the first display area can be maintained.

In a program in accordance with an embodiment of the present invention, in cases where the second display area is a display area independent of the first display area, the second control means may change the arrangement position of the second display area to an area without the first display area when the first display area is moved by the first control means.

By the above configuration, the arrangement position of the second display area is set based on the position of the first display area after the movement in the case where the second display area is independent of the first display area, by which the viewability and operability of the first display area can be maintained.

A display control device in accordance with an embodiment of the present invention may further comprise setting means for setting contents of the control by the second control means.

By the above configuration, the contents of the change of at least one of the configuration, display content and arrangement position of the second display area which is made based on the status of the first display area can be set, by which control according to the intention of the user can be realized.

A program in accordance with an embodiment of the present invention may further instruct the computer to function as setting means for setting contents of the control by the second control means.

By the above configuration, the contents of the change of at least one of the configuration, display content and arrangement position of the second display area which is made based on the status of the first display area can be set, by which control according to the intention of the user can be realized.

A display control device in accordance with an embodiment of the present invention may display an editing area (for displaying print content to be printed by a printing device) in the first display area, while displaying one or more icons (for calling functions for creating the print content in the editing area) in the second display area.

By the above configuration, the print content to be printed by the printing device can be created with efficiency.

A program in accordance with an embodiment of the present invention may display an editing area (for displaying print content to be printed by a printing device) in the first display area, while displaying one or more icons (for calling functions for creating the print content in the editing area) in the second display area.

By the above configuration, the print content to be printed by the printing device can be created with efficiency.

In a display control device in accordance with an embodiment of the present invention, the printing device can be a device for printing on a rectangular print medium whose length in a particular direction is variable.

By the above configuration, the print content to be printed on a long and narrow print medium can be displayed across the full width of the screen, by which the operability during the creation/editing of the print content is improved.

In a program in accordance with an embodiment of the present invention, the printing device can be a device for printing on a rectangular print medium whose length in a particular direction is variable.

By the above configuration, the print content to be printed on a long and narrow print medium can be displayed across the full width of the screen, by which the operability during the creation/editing of the print content is improved.

Incidentally, the programs in accordance with the embodiments of the present invention which have been described above can be distributed to computers by storing them in a removable record medium such as a CD-ROM or a fixed record medium such as a hard disk, or via a communication network like the Internet by use of a wired or wireless telecommunication means.

What is claimed is:

1. A display control device for displaying a first display area and a second display area on a screen, comprising:
    a first controller that changes and controls at least one of a first display content and a first character input direction of the first display area; and
    a second controller that changes and controls at least one of a second display content and a second character input direction of the second display area based on the at least one of the first display content and the first character input direction changed by the first controller,
    wherein the second controller successively controls the second display content or the second character input direction to be wide in a horizontal direction when the first display content or the first character input direction of the first display area is respectively controlled by the first controller, in response to user manipulation of the first display area, to be wide in the horizontal direction, and the second controller successively controls the second display content or the second character input direction of the second display area to be long in a vertical direction when the first display content or the first character input direction of the first display area is respectively controlled, in response to user manipulation of the first display area, by the first controller to be long in the vertical direction.

2. The display control device according to claim 1, wherein when the second display area has been built in the first display area, the second controller controls a second configuration of the second display area to let the second display area be a display area independent of the first display area when the first display area is enlarged by the first controller.

3. The display control device according to claim 1, wherein when the second display area is a display area independent of the first display area, the second controller changes a second arrangement position of the second display area to an area without the first display area when the first display area is moved by the first controller.

4. The display control device according to claim 1, further comprising a setting system that sets contents of the control by the second controller.

5. The display control device according to claim 1, wherein:
    an editing area for displaying print content to be printed by a printing device is displayed in the first display area, and
    one or more icons for calling functions for creating the print content in the editing area are displayed in the second display area.

6. The display control device according to claim 5, wherein the printing device is a device for printing on a rectangular print medium whose length in a particular direction is variable.

7. A computer-readable storage medium embedded with a computer program for use on a display control device for displaying a first display area and a second display area on a screen, the computer program comprising computer-executable instructions that cause the display control device to function as:
    a first controller that controls at least one of a first display content and a first character input direction of the first display area; and
    a second controller that controls at least one of a second display content and a second character input direction of the second display area based on the at least one of the first display and the first character input direction changed by the first controller,
    wherein the second controller successively controls the second character input direction or the second display content of the second display area to be wide in a horizontal direction when the first character input direction or the first display content of the first display area is respectively controlled by the first controller, in response to user manipulation of the first display area, to be wide in the horizontal direction, and the second controller successively controls the second character input direction or the second display content of the second display area to be long in a vertical direction when the first character input direction or the first display content of the first display area is respectively controlled, in response to user manipulation of the first display area, by the first controller to be long in the vertical direction.

8. The computer-readable storage medium according to claim 7, wherein when the second display area has been built in the first display area, the second controller controls a second configuration of the second display area to let the second display area be a display area independent of the first display area when the first display area is enlarged by the first controller.

9. The computer-readable storage medium according to claim 7, wherein when the second display area is a display area independent of the first display area, the second controller changes a second arrangement position of the second display area to an area without the first display area when the first display area is moved by the first controller.

10. The computer-readable storage medium according to claim 7, further comprising computer-readable instructions that cause the display control device to function as a setting system that sets contents of the control by the second controller.

11. The computer-readable storage medium according to claim 7, wherein:
    a creation area for creating print content to be printed by a printing device is displayed in the first display area, and
    one or more icons for calling functions for creating the print content in the creation area are displayed in the second display area.

12. The computer-readable storage medium according to claim 11, wherein the printing device is a device for printing on a rectangular print medium whose length in a particular direction is variable.

13. A display control device for controlling display on a screen, comprising:
- a first controller that controls at least one of a first display content and a first character input direction of an editing area for editing work; and
- a second controller that controls at least one of a second display content and a second character input direction of an auxiliary area for displaying information for assisting the editing work in the editing area depending on a change of the at least one of the first display content and the first character input direction of the editing area made by the first controller,
- wherein the second controller controls the auxiliary area to be wide in a horizontal direction when the editing area is controlled by the first controller, in response to user manipulation of the editing area, to be wide in the horizontal direction, and wherein the second controller controls the auxiliary area to be long in a vertical direction when the editing area is controlled by the first controller, in response to user manipulation of the editing area, to be long in the vertical direction.

14. A display control device for controlling display on a screen, comprising:
- a first controller that controls at least one of a first display content and a first character input direction of a print area with respect to an editing area for editing work; and
- a second controller that executes control so as to change at least one of a second display content and a second character input direction of an auxiliary area for displaying information for assisting the editing work in the editing area to be wide in a horizontal direction when the at least one of the first display content and the first character input direction is wide in the horizontal direction, respectively, and executes control so as to change at least one of the second display content and the second character input direction of the auxiliary area for displaying information for assisting the editing work in the editing area to be wide in a vertical direction when the at least one of the first display content and the first character input direction is wide in the vertical direction, respectively.

15. A method for controlling display on a screen, comprising the steps of:
- detecting at least one of a first display content and a first character input direction of an editing area for editing work;
- judging whether a change of at least one of a second display content and a second character input direction of an auxiliary area for displaying information for assisting the editing work in the editing area is necessary or not based on the detection of the at least one of the first display content and the first character input direction of the editing area; and
- respectively changing the at least one of the second display content and the second character input direction of the auxiliary area to be wide in a horizontal direction when the at least one of the first display content and the first character input direction is wide in the horizontal direction, and changing at least one of the second display content and the second character input direction of the auxiliary area for displaying information for assisting the editing work in the editing area to be wide in a vertical direction when the at least one of the first display content and the first character input direction is wide in the vertical direction.

16. A display control device for displaying a first display area and a second display area on a screen, comprising:
- a controller that:
  - receives a user input;
  - changes at least one of a first display content and a first character input direction of the first display area in response to the user input; and
  - changes at least one of a second display content and a second character input direction of the second display area in response to the change in the at least one of the first display content and the first character input direction, such that:
- wherein when the first display area is changed in way to overlap the second display area, the second display area is changed such that the first and second display areas do not overlap, and
- wherein the second controller successively controls a second configuration of the second display area to be wide in a horizontal direction when a first configuration or the first display content of the first display area is controlled by the first controller, in response to user manipulation of the first display area, to be wide in the horizontal direction, and the second controller successively controls the second configuration of the second display area to be long in a vertical direction when the first configuration or the first display content of the first display area is controlled, in response to user manipulation of the first display area, by the first controller to be long in the vertical direction.

* * * * *